United States Patent
Kaima

(10) Patent No.: US 8,630,015 B2
(45) Date of Patent: Jan. 14, 2014

(54) IMAGE FORMING APPARATUS AND IMAGE FORMING METHOD FOR CONVERTING IMAGE DATA TO A HIGHER RESOLUTION

(75) Inventor: Nobuyoshi Kaima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 365 days.

(21) Appl. No.: 13/045,850

(22) Filed: Mar. 11, 2011

(65) Prior Publication Data

US 2011/0228287 A1 Sep. 22, 2011

(30) Foreign Application Priority Data

Mar. 17, 2010 (JP) .................................. 2010-061678

(51) Int. Cl.
*G06K 15/02* (2006.01)
(52) U.S. Cl.
USPC ........... 358/1.2; 358/3.12; 382/276; 382/298; 382/299; 382/300
(58) Field of Classification Search
USPC ........... 358/1.2, 3.12; 382/276, 298, 299, 300
See application file for complete search history.

(56) References Cited

U.S. PATENT DOCUMENTS

| | | | | |
|---|---|---|---|---|
| 5,608,853 | A * | 3/1997 | Dujari et al. ................... | 345/668 |
| 7,770,998 | B2 | 8/2010 | Shinohara et al. | |
| 2008/0085063 | A1 | 4/2008 | Saito | |
| 2008/0239336 | A1 * | 10/2008 | Tanabe et al. ................... | 358/1.7 |
| 2008/0309951 | A1 | 12/2008 | Kishi et al. | |
| 2009/0066981 | A1 | 3/2009 | Kaima et al. | |

FOREIGN PATENT DOCUMENTS

| | | | |
|---|---|---|---|
| EP | 0 359 463 A2 | 3/1990 | |
| EP | 2 040 129 A2 | 3/2009 | |
| EP | 2040129 A2 * | 3/2009 | ............. G03G 15/32 |
| JP | 2007-276270 | 10/2007 | |
| JP | 2009-83472 | 4/2009 | |
| JP | 2010-213117 | 9/2010 | |

OTHER PUBLICATIONS

Office Action mailed on Oct. 1, 2013, in counterpart Japanese Appln No. 2010-061678 (2 pages).

* cited by examiner

*Primary Examiner* — Jacky X Zheng
(74) *Attorney, Agent, or Firm* — Oblon, Spivak, McClelland, Maier & Neustadt, L.L.P.

(57) ABSTRACT

An image forming apparatus includes a resolution converting unit, an address generating unit, a density determining unit, and an image path selector. The resolution converting unit converts a resolution of image data into a higher resolution. The address generating unit performs a position determining process of determining a position of an additional pixel on the basis of main-scanning directional positions of pixels composing the converted image data and respective shift amounts of the pixels shifted to a sub-scanning direction. The density determining unit determines a density of the additional pixel on the basis of a density of a pixel located at a position corresponding to the determined position in the image data. The image path selector scales the image data up or down by controlling the address generating unit while adding the additional pixel having the determined density to the determined position.

11 Claims, 22 Drawing Sheets

FIG. 8

| DENSITY OF 1200-dpi PIXEL | PHASE | DENSITY OF ADDITIONAL PIXEL |
|---|---|---|
| 2'b00 | 0 | 4'b0000 |
|  | 1 |  |
|  | 2 |  |
|  | 3 |  |
| 2'b01 | 0 | 4'b0110 |
|  | 1 | 4'b0110 |
|  | 2 | 4'b0100 |
|  | 3 | 4'b0100 |
| 2'b10 | 0 | 4'b1111 |
|  | 1 | 4'b1111 |
|  | 2 | 4'b0110 |
|  | 3 | 4'b0110 |
| 2'b11 | 0 | 4'b1111 |
|  | 1 |  |
|  | 2 |  |
|  | 3 |  |

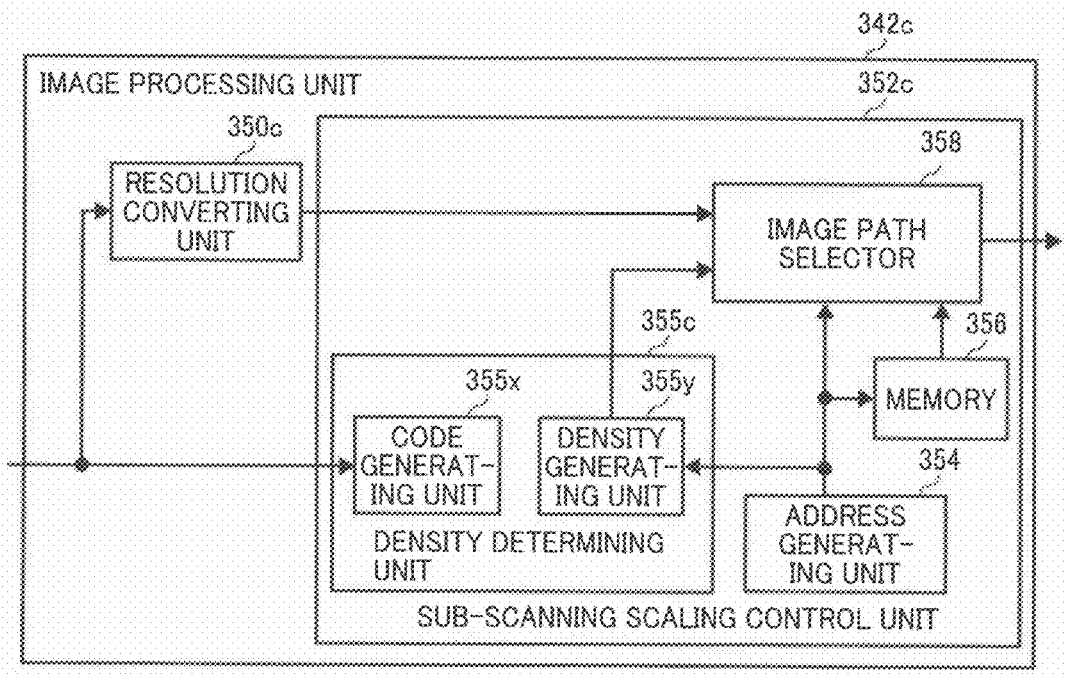

| code (5:0) | PHASE | DENSITY OF ADDITIONAL PIXEL |
|---|---|---|
| 00 (hex) | 0 | 4'b0000 |
| | 1 | |
| | 2 | |
| | 3 | |
| 01 (hex) | 0 | 4'b0110 |
| | 1 | 4'b0110 |
| | 2 | 4'b0110 |
| | 3 | 4'b0110 |
| 02 (hex) | 0 | 4'b1110 |
| | 1 | 4'b1110 |
| | 2 | 4'b1000 |
| | 3 | 4'b1000 |
| ... | 0 | ... |
| | 1 | |
| | 2 | |
| | 3 | |
| 3F (hex) | 0 | 4'b1111 |
| | 1 | 4'b1111 |
| | 2 | 4'b1111 |
| | 3 | 4'b1111 |

FIG. 18

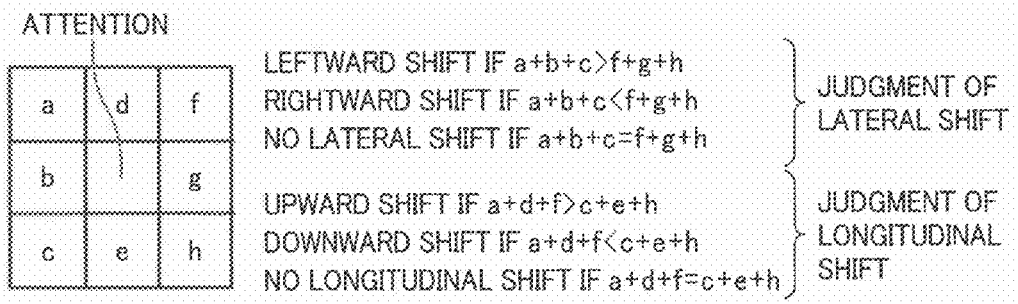

| phs (3 : 0) | CONDITIONS OF JUDGMENT | OUTLINE |
|---|---|---|
| 0 | NO LATERAL SHIFT, NO LONGITUDINAL SHIFT | NO SHIFT |
| 1 | LEFTWARD SHIFT, NO LONGITUDINAL SHIFT | LEFTWARD SHIFT |
| 2 | RIGHTWARD SHIFT, NO LONGITUDINAL SHIFT | RIGHTWARD SHIFT |
| 3 | NO LATERAL SHIFT, UPWARD SHIFT | UPWARD SHIFT |
| 4 | NO LATERAL SHIFT, DOWNWARD SHIFT | DOWNWARD SHIFT |
| 5 | LEFTWARD SHIFT, UPWARD SHIFT | LEFT-UPWARD SHIFT |
| 6 | RIGHTWARD SHIFT, UPWARD SHIFT | RIGHT-UPWARD SHIFT |
| 7 | LEFTWARD SHIFT, DOWNWARD SHIFT | LEFT-DOWNWARD SHIFT |
| 8 | RIGHTWARD SHIFT, DOWNWARD SHIFT | RIGHT-DOWNWARD SHIFT |

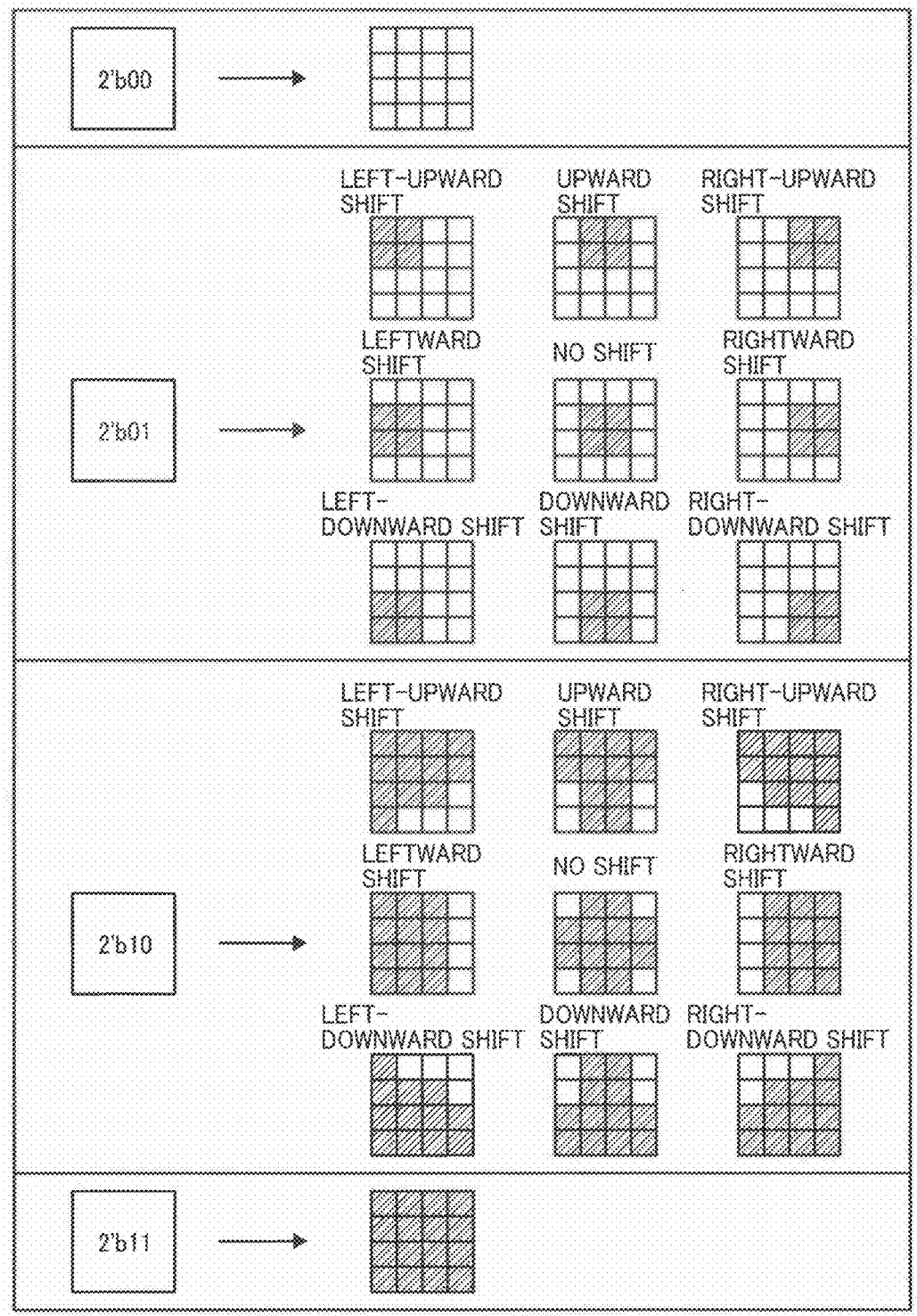

FIG. 20

| D*(1:0) | phs(3:0) | PHASE | DENSITY OF ADDITIONAL PIXEL |
|---|---|---|---|
| 2'b01 | 0 | 0 | 4'b0000 |
| | 0 | 1 | 4'b0110 |
| | 0 | 2 | 4'b0110 |
| | 0 | 3 | 4'b0000 |
| | 1 | 0 | 4'b0000 |
| | 1 | 1 | 4'b1100 |
| | 1 | 2 | 4'b1100 |
| | 1 | 3 | 4'b0000 |
| | 2 | 0 | 4'b0000 |
| | 2 | 1 | 4'b0011 |
| | 2 | 2 | 4'b0011 |
| | 2 | 3 | 4'b0000 |
| | 3 | 0 | 4'b0110 |
| | 3 | 1 | 4'b0110 |
| | 3 | 2 | 4'b0000 |
| | 3 | 3 | 4'b0000 |
| | 4 | 0 | 4'b0000 |
| | 4 | 1 | 4'b0000 |
| | 4 | 2 | 4'b0110 |
| | 4 | 3 | 4'b0110 |
| | 5 | 0 | 4'b1100 |
| | 5 | 1 | 4'b1100 |
| | 5 | 2 | 4'b0000 |
| | 5 | 3 | 4'b0000 |
| | 6 | 0 | 4'b0011 |
| | 6 | 1 | 4'b0011 |
| | 6 | 2 | 4'b0000 |
| | 6 | 3 | 4'b0000 |
| | 7 | 0 | 4'b0000 |
| | 7 | 1 | 4'b0000 |
| | 7 | 2 | 4'b1100 |
| | 7 | 3 | 4'b1100 |
| | 8 | 0 | 4'b0000 |
| | 8 | 1 | 4'b0000 |
| | 8 | 2 | 4'b0011 |
| | 8 | 3 | 4'b0011 |
| 2'b00 | NO OBJECT | NO OBJECT | 4'b0000 |
| 2'b11 | NO OBJECT | NO OBJECT | 4'b1111 |

| D*(1:0) | DITHER | PHASE | DENSITY OF ADDITIONAL PIXEL |
|---|---|---|---|
| 2'b01 | 135° | 0 | 4'b1000 |
| | | 1 | 4'b0100 |
| | | 2 | 4'b0010 |
| | | 3 | 4'b0001 |
| | 45° | 0 | 4'b0001 |
| | | 1 | 4'b0010 |
| | | 2 | 4'b0100 |
| | | 3 | 4'b1000 |
| | 162° | 0 | 4'b0000 |
| | | 1 | 4'b1100 |
| | | 2 | 4'b0011 |
| | | 3 | 4'b0000 |
| | 18° | 0 | 4'b0000 |
| | | 1 | 4'b0011 |
| | | 2 | 4'b1100 |
| | | 3 | 4'b0000 |
| | 90° | 0 | 4'b0100 |
| | | 1 | 4'b0100 |
| | | 2 | 4'b0100 |
| | | 3 | 4'b0100 |
| 2'b10 | 135° | 0 | 4'b1100 |
| | | 1 | 4'b1110 |
| | | 2 | 4'b0111 |
| | | 3 | 4'b0011 |
| | 45° | 0 | 4'b0011 |
| | | 1 | 4'b0111 |
| | | 2 | 4'b1110 |
| | | 3 | 4'b1100 |
| | 162° | 0 | 4'b1000 |
| | | 1 | 4'b1111 |
| | | 2 | 4'b1111 |
| | | 3 | 4'b0001 |
| | 18° | 0 | 4'b1000 |
| | | 1 | 4'b1111 |
| | | 2 | 4'b1111 |
| | | 3 | 4'b0001 |
| | 90° | 0 | 4'b0110 |
| | | 1 | 4'b1110 |
| | | 2 | 4'b0111 |
| | | 3 | 4'b0110 |
| 2'b00 | NO OBJECT | NO OBJECT | 4'b0000 |
| 2'b11 | NO OBJECT | NO OBJECT | 4'b1111 |

| D*(1:0) | PHASE | DENSITY OF ADDITIONAL PIXEL |
|---|---|---|
| 2'b00 | NO OBJECT | 4'b0000 |
| 2'b01 | NO OBJECT | 4'b0100 |
| 2'b10 | NO OBJECT | 4'b0110 |
| 2'b11 | NO OBJECT | 4'b1111 |

IMAGE FORMING APPARATUS AND IMAGE FORMING METHOD FOR CONVERTING IMAGE DATA TO A HIGHER RESOLUTION

CROSS-REFERENCE TO RELATED APPLICATIONS

The present application claims priority to and incorporates by reference the entire contents of Japanese Patent Application No. 2010-061678 filed in Japan on Mar. 17, 2010.

BACKGROUND OF THE INVENTION

1. Field of the Invention

The present invention relates to image formation, and more particularly, to an image forming apparatus and an image forming method for forming a latent image with multiple beams.

2. Description of the Related Art

With the functional advancement of an image forming apparatus, the image formation rate of the image forming apparatus per unit time, i.e., the number of prints per minute (PPM) increases. In recent years, to achieve formation of a higher-resolution image at a higher speed, an image forming apparatus which performs multi-beam exposure using a vertical cavity surface emitting laser (hereinafter, referred to as a "VCSEL") has been proposed. Furthermore, in response to a request for resource saving, a type of image forming apparatus capable of duplex printing has been available.

Therefore, in an automatic duplex printing apparatus, with improvement in the PPM, a time interval between printing an image on the first side of a sheet and printing an image on the second side tends to be shortened. For example, in high-speed types of duplex printing apparatuses, some apparatuses perform printing images on the first and second sides within 10 seconds.

However, with the increase in speed, a distance for conveying a sheet between heat fixing of an image on the first side and printing of an image on the second side tends to be shorter, and a time to cool down the sheet after the sheet leaves a high-temperature section is reduced, so the printing sheet becomes a state susceptible to the thermal influence.

When duplex printing is performed in such a state, in the case where an 80-micrometer-thick high-quality sheet is used as a printing sheet, it has been confirmed that a magnification difference of 0.2% to 0.4% between images printed on the first and second sides corresponding to the front and back of the sheet occurs due to changes in heat and humidity.

To cope with the above described problem, there has been conventionally disclosed a method to provide a sub-scanning magnification changing function to an image forming apparatus to eliminate a magnification difference so that the image forming apparatus can reduce an image by culling sub-scanning image data or enlarge an image by adding image data (for example, Japanese Patent Application Laid-open No. 2009-83472).

However, in the method disclosed in Japanese Patent Application Laid-open No. 2009-83472, it is impossible to resolve image deterioration caused in the image enlarging process. Specifically, there is a problem that the higher the resolution of an image to be formed, such as an image having the periodicity, for example, that a 1-line line is formed every 5 lines, the more conspicuously a global image defect, such as uneven density or moiré, appears when a line is culled or added to adjust the magnification.

Furthermore, with the process to eliminate a magnification difference, it is necessary to prevent banding caused by interference between a screen ruling and a magnification ratio or the like.

SUMMARY OF THE INVENTION

It is an object of the present invention to at least partially solve the problems in the conventional technology.

According to an aspect of the present invention, an image forming apparatus includes: an image-data acquiring unit that acquires image data composed of a plurality of pixels; a resolution converting unit that converts a resolution of the acquired image data into a higher resolution than the resolution of the image data; a position determining unit that performs a position determining process of determining a position of an additional pixel to be added on the basis of main-scanning directional positions of pixels composing the converted image data and respective shift amounts of the pixels shifted to a sub-scanning direction from the main-scanning directional positions; a density determining unit that determines a density of the additional pixel on the basis of a density of a pixel located at a position corresponding to the determined position in the acquired image data; a correcting unit that performs a correction process of adding the additional pixel having the determined density to the determined position; and a scaling unit that controls the position determining unit and the correcting unit so as to scale the image data up or down by causing the position determining unit and the correcting unit to repeatedly perform the position determining process and the correction process with respect to each of sub-scanning lines of pixels and then repeatedly perform the position determining process and the correction process with respect to each of main-scanning lines of pixels.

According to another aspect of the present invention, an image forming method includes: acquiring image data composed of a plurality of pixels; converting a resolution of the acquired image data into a higher resolution than the resolution of the image data; performing a position determining process of determining a position of an additional pixel to be added on the basis of main-scanning directional positions of pixels composing the converted image data and respective shift amounts of the pixels shifted to a sub-scanning direction from the main-scanning directional positions; determining a density of the additional pixel on the basis of a density of a pixel located at a position corresponding to the determined position in the acquired image data; performing a correction process of adding the additional pixel having the determined density to the determined position; and scaling the image data up or down by repeatedly performing the position determining process and the correction process with respect to each of sub-scanning lines of pixels and then repeatedly performing the position determining process and the correction process with respect to each of main-scanning lines of pixels by controlling a position determining unit and a correcting unit.

According to still another aspect of the present invention an image forming means includes: an image-data acquiring means for acquiring image data composed of a plurality of pixels; a resolution converting means for converting a resolution of the acquired image data into a higher resolution than the resolution of the image data; a position determining means for performing a position determining process of determining a position of an additional pixel to be added on the basis of main-scanning directional positions of pixels composing the converted image data and respective shift amounts of the pixels shifted to a sub-scanning direction from the main-scanning directional positions; a density determining means for determining a density of the additional pixel on the basis of a density of a pixel located at a position corresponding to the determined position in the acquired image data; a correcting means for performing a correction process of adding the additional pixel having the determined density to the determined position; and a scaling means for controlling the position determining means and the correcting means so as to scale the image data up or down by causing the position determining means and the correcting means to repeatedly perform the position determining process and the correction process with respect to each of sub-scanning lines of pixels and then repeatedly perform the position determining process and the correction process with respect to each of main-scanning lines of pixels.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a functional block diagram of an image processing unit 342a;

FIG. 7 is a schematic diagram for explaining a resolution increasing process performed by a resolution converting unit 350a;

FIG. 8 is a diagram showing an example of density data according to the first embodiment;

FIG. 10 is a flowchart showing a procedure of an additional-pixel-density determining process performed by the image processing unit 342a;

FIG. 14 is a block diagram illustrating a functional configuration of an image processing unit 342c according to a third embodiment;

FIG. 15 is a diagram showing an example of a pattern used in generation of a code by a code generating unit 354c;

FIG. 18 is an explanatory diagram showing an example of shift information;

FIG. 19 is an explanatory diagram illustrating a shift conversion performed by a resolution converting unit 350d;

FIG. 20 is a diagram showing an example of density data according to the fourth embodiment;

FIG. 22 is an explanatory diagram showing an example of designation of pixel arrangement based on dither information;

FIG. 23 is a diagram showing an example of density data according to the fifth embodiment;

DETAILED DESCRIPTION OF THE PREFERRED EMBODIMENTS

Exemplary embodiments of an image forming apparatus and an image forming method according to the present invention are explained in detail below with reference to the accompanying drawings. In the embodiments described below, there is shown an example in which the apparatus according to the present invention is applied to a multifunction peripheral (MFP) having at least two of a copy function, a printer function, a scanner function, and a facsimile function; however, the present invention is not limited to the above described example.

First Embodiment

Figure 1:
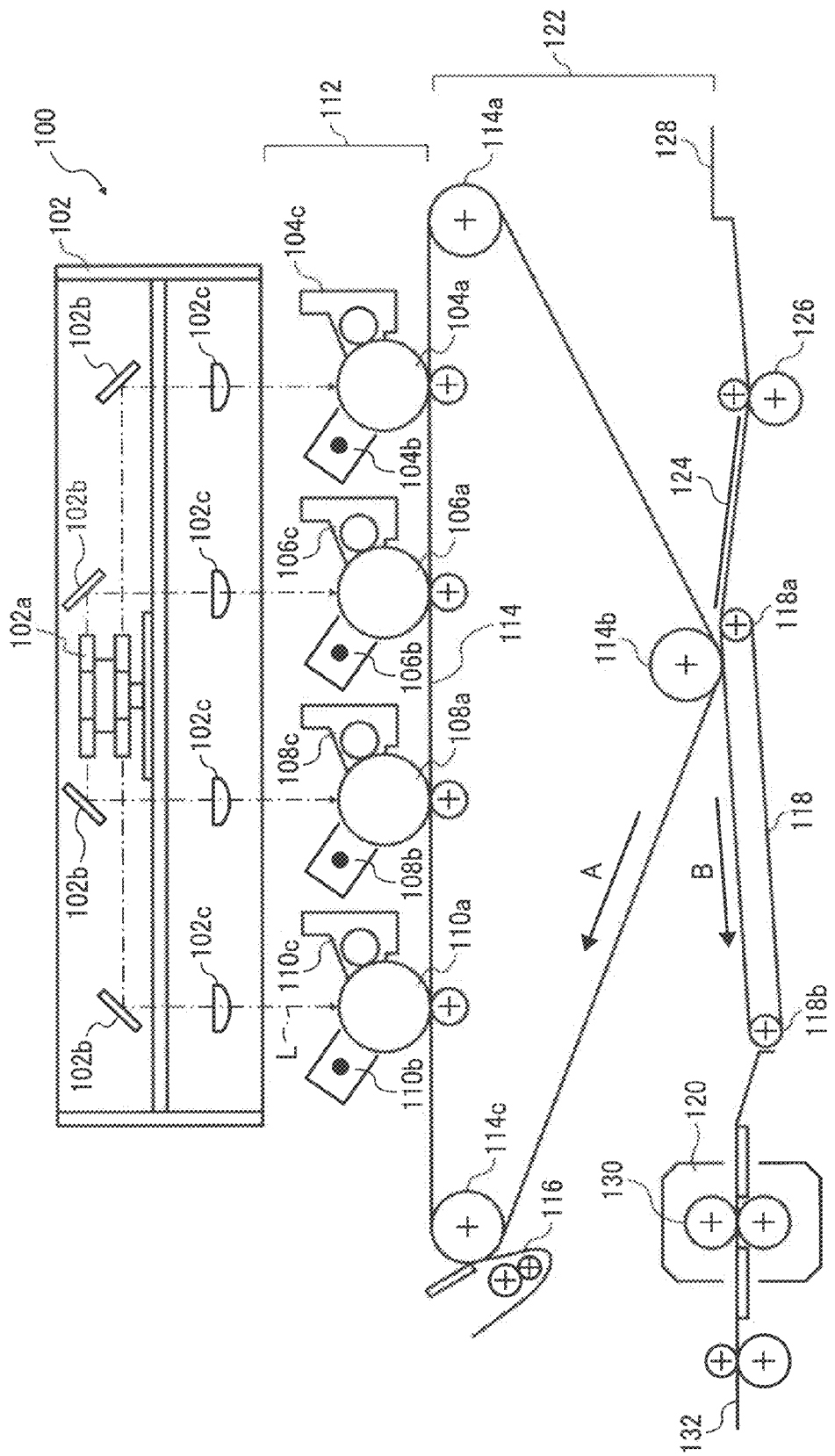
FIG. 1 is a schematic diagram illustrating a mechanical configuration of an image forming apparatus according to a first embodiment.

FIG. 1 is a schematic diagram illustrating a mechanical configuration of an image forming apparatus according to a first embodiment. As shown in FIG. 1, an image forming apparatus 100 according to the first embodiment mainly includes: an optical device 102 including optical elements such as a VCSEL 200 (see FIGS. 2 and 3) and a polygon mirror 102a; an image forming unit 112 including photosensitive drums charging devices, developing devices, and the like; and a transfer unit 122 including an intermediate transfer belt and the like. The optical device 102 includes the VCSEL 200 as a semiconductor laser. As shown in FIG. 1, light beams emitted from the VCSEL 200 (not shown in FIG. 1) are first collected by a first cylindrical lens (not shown), and deflected to a reflection mirrors 102b by the polygon mirror 102a.

Figure 2:
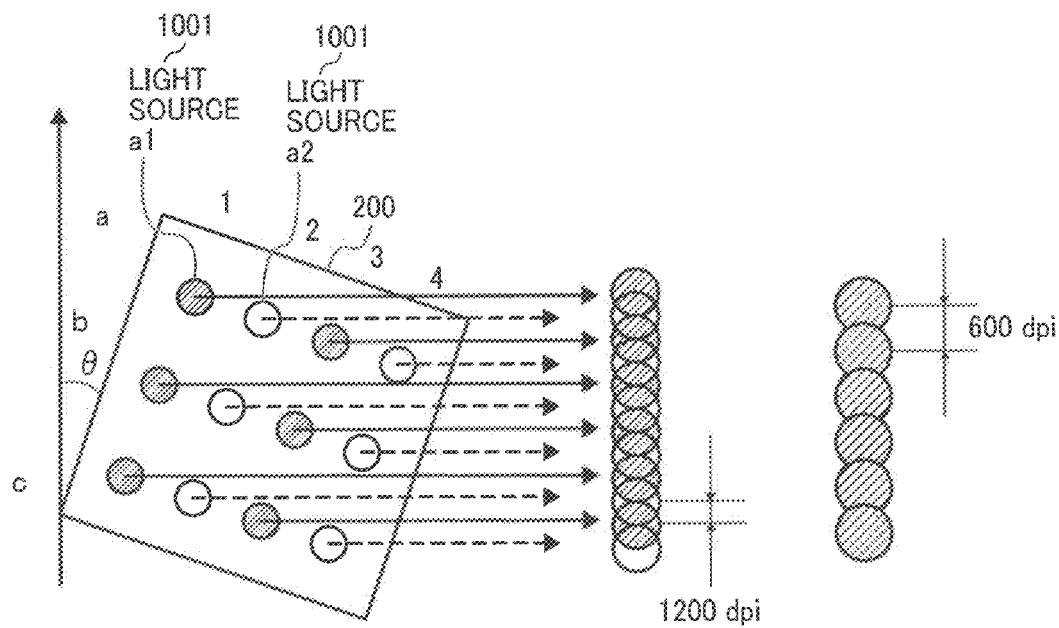
FIG. 2 is a configuration diagram of a VCSEL 200 incorporated in an optical device 102 according to the present embodiment.

The VCSEL 200 here is a surface-emitting semiconductor laser in which a plurality of light sources (semiconductor lasers) is arranged on the same chip in a lattice pattern. Various technologies for an image forming apparatus using such a VCSEL 200 are known; the optical device 102 of the image forming apparatus 100 according to the present embodiment incorporates the VCSEL 200 in a configuration similar to those of the publicly-known technologies. FIG. 2 is a configuration diagram of the VCSEL 200 incorporated in the optical device 102 according to the present embodiment. The VCSEL 200 according to the present embodiment is, as shown in FIG. 2, composed of a semiconductor laser array that a plurality of light sources 1001 (a plurality of semiconductor lasers) is arranged in a lattice pattern. The VCSEL 200 is installed so that an array direction of the plurality of light sources 1001 is tilted at a predetermined angle θ to a rotating shaft of the polygon mirror 102a provided as a deflector.

In FIG. 2, vertical arrays of the light sources are denoted by a to c, and lateral arrays are denoted by 1 to 4; for example, the top-left light source 1001 in FIG. 2 is denoted by a1. Since the light sources 1001 are obliquely arranged at a polygon mirror angle θ with respect to a sub-scanning direction, it is assumed that the light source a1 and the light source a2 expose different scanning positions to light, and a pixel (one pixel) is constructed by this two light sources, i.e., in FIG. 2, one pixel is achieved by two light sources. For example, when it is assumed that one pixel is constructed by the two light sources a1 and a2 and another one pixel is constructed by the two light sources a3 and a4, pixels as illustrated on the extreme right in FIG. 2 are formed by the light sources in the drawing. When the vertical direction in the drawing is set as the sub-scanning direction, a center-to-center distance between adjacent pixels each constructed by two light sources is equivalent to 600 dpi. At this time, a center-to-center distance between the two light sources constructing one pixel is equivalent to 1200 dpi, and the light-source density is twice as much as the pixel density. Therefore, by changing a light quantity ratio of light sources constructing one pixel, the position of the gravity center of the pixel can be displaced in the sub-scanning direction, and it is possible to achieve high-precision image formation.

The image forming apparatus 100 includes the post-object type optical device 102 which does not use an f-theta lens. In the embodiment shown in FIG. 1, light beams L respectively corresponding to cyan (C), magenta (M), yellow (Y), and black (K) image data are emitted, and reflected by the reflection mirrors 102b, and then again collected by second cylindrical lenses 102c, and after that, photosensitive drums 104a, 106a, 108a, and 110a are exposed to the light beams L, respectively.

Since the exposure of the light beams L is performed with use of a plurality of optical elements as described above, as for a main scanning direction and the sub-scanning direction, timing synchronization is performed. Incidentally, hereinafter, the main scanning direction is defined as a scanning direction of the light beams, and the sub-scanning direction is defined as a direction perpendicular to the main scanning direction.

Each of the photosensitive drums 104a, 106a, 108a, and 110a includes a photoconductive layer including at least a charge generation layer and a charge transport layer on a conductive drum made of aluminum or the like. The photoconductive layers are provided to correspond to the photosensitive drums 104a, 106a, 108a, and 110a, and applied with surface charges by charger units 104b, 106b, 108b, and 110b each including a corotron, a scorotron, or a charging roller, respectively.

Static charges applied to the photosensitive drums 104a, 106a, 108a, and 110a by the respective charger units 104b, 106b, 108b, and 110b are exposed to the light beams L, and electrostatic latent images are formed. The electrostatic latent images formed on the photosensitive drums 104a, 106a, 108a, and 110a are developed by developing units 104c, 106c, 108c, and 110c each including a developing sleeve, a developer supply roller, a control blade, and the like, respectively, and developer images are formed.

The developer images formed on the photosensitive drums 104a, 106a, 108a, and 110a are transferred onto an intermediate transfer belt 114, which moves in a direction of an arrow A in accordance with rotation of conveying rollers 114a, 114b, and 114c, in a superimposed manner. The superimposed C, M, Y, and K developer images (hereinafter, referred to as a "multicolor developer image") transferred onto the intermediate transfer belt 114 are conveyed to a secondary transfer unit in accordance with the movement of the intermediate transfer belt 114. The secondary transfer unit includes a secondary transfer belt 118 and conveying rollers 118a and 118b. The secondary transfer belt 118 moves in a direction of an arrow B in accordance with rotation of the conveying rollers 118a and 118b. An image receiving medium 124, such as high-quality paper or a plastic sheet, is fed from an image-receiving-media containing unit 128, such as a paper cassette, to the secondary transfer unit by a conveying roller 126.

The secondary transfer unit applies a secondary bias to the intermediate transfer belt 114, whereby the multicolor developer image on the intermediate transfer belt 114 is transferred onto the image receiving medium 124 attracted and held on the secondary transfer belt 118. The image receiving medium 124 is supplied to a fixing unit 120 in accordance with the movement of the secondary transfer belt 118. The fixing unit 120 includes a fixing member 130, such as a fixing roller made of silicon rubber or fluorine-contained rubber, and applies heat and pressure to the image receiving medium 124 and the multicolor developer image, and outputs the image receiving medium 124 as a printed material 132 to outside the image forming apparatus 100. After the multicolor developer image on the intermediate transfer belt 114 is transferred onto the image receiving medium 124, a cleaning unit 116 including a cleaning blade removes transfer residual developers from the intermediate transfer belt 114 to make ready for a next image forming process.

Figure 3:
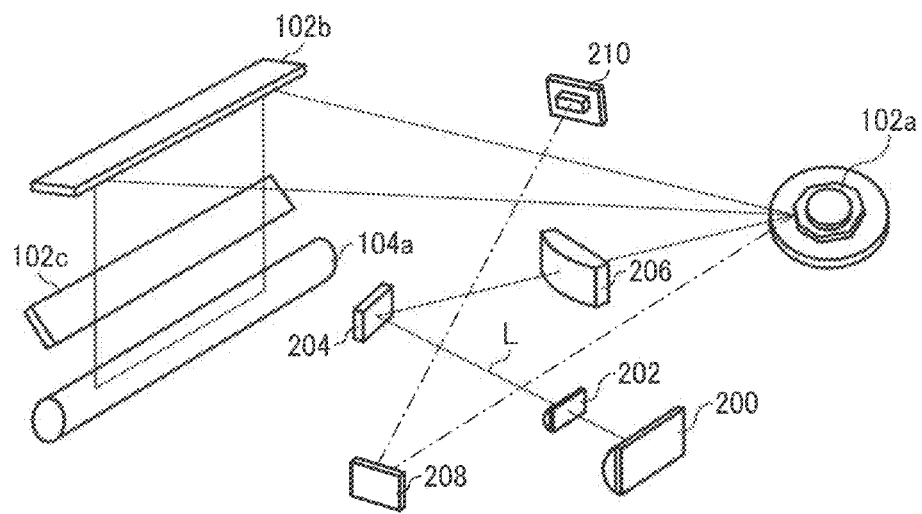
FIG. 3 is a schematic perspective view illustrating a case where the optical device 102 including the VCSEL 200 exposes a photosensitive drum 104a to light beams L.

FIG. 3 is a schematic perspective view illustrating a case where the optical device 102 including the VCSEL 200 exposes the photosensitive drum 104a to a light beam L. The light beam L emitted from the VCSEL 200 is collected by a first cylindrical lens 202 used to shape a light beam flux, and goes through a reflection mirror 204 and an imaging lens 206, and then is deflected by the polygon mirror 102a. The polygon mirror 102a is driven to rotate by, for example, a spindle motor which spins several thousand times to tens of thousands times per minute. After the light beam L reflected by the polygon mirror 102a is reflected by the reflection mirror 102b, the light beam L is again shaped by the second cylindrical lens 102c, and the photosensitive drum 104a is exposed to the light beam L.

Furthermore, to synchronize a start timing of scanning in the sub-scanning direction by the light beam L, a reflection mirror 208 is arranged. The reflection mirror 208 reflects the light beam L to a synchronization detection device 210 including a photodiode and the like before the scanning in the sub-scanning direction is started. When detecting the light beam, the synchronization detection device 210 generates a synchronization signal to start sub-scanning, and synchronizes a process, such as a process of generating a drive control signal to the VCSEL 200.

The VCSEL 200 is driven by a pulse signal sent from a GAVD 310 to be described later, and as described later, the position on the photosensitive drum 104a corresponding to a predetermined image bit of image data is exposed to a light beam L emitted from the VCSEL 200, and an electrostatic latent image is formed on the photosensitive drum 104a.

Figure 4:
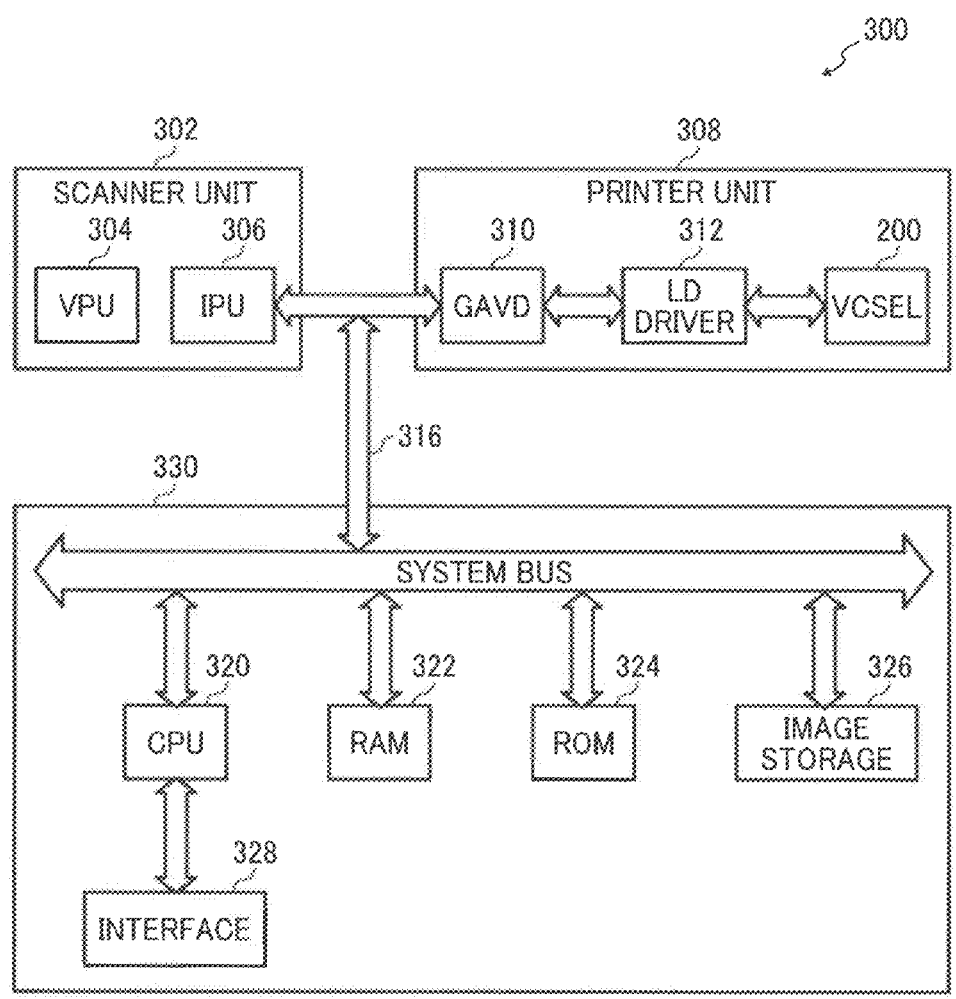
FIG. 4 is a schematic functional block diagram of a control unit 300 of a present image forming apparatus 100.

FIG. 4 is a schematic functional block diagram of a control unit 300 of the image forming apparatus 100. The control unit 300 includes a scanner unit 302, a printer unit 308, and a main control unit 330. The scanner unit 302 functions as a means for reading an image, and includes a VPU 304 and an IPU 306. The VPU 304 converts an analog signal read by a scanner into a digital signal, and performs a black offset correction, a shading correction, and a pixel location correction. The IPU 306 performs image processing mainly for converting the acquired image in the RGB color system into digital image data in the CMYK color system. The read image acquired by the scanner unit 302 is output as digital data to the printer unit 308.

The printer unit 308 includes the GAVD 310, an LD driver 312, and the VCSEL 200. The GAVD 310 functions as a control means for performing the drive control of the VCSEL 200. The LD driver 312 supplies a current for driving a semiconductor laser element to the semiconductor laser element in response to a drive control signal generated by the GAVD 310. The VCSEL 200 mounts thereon two-dimensionally-arranged semiconductor laser elements. The GAVD 310 according to the present embodiment executes a resolution increasing process on image data transmitted from the scanner unit 302 by dividing pixel data in a size corresponding to the spatial size of the semiconductor laser elements of the VCSEL 200.

The scanner unit 302 and the printer unit 308 are connected to the main control unit 330 via a system bus 316, and image reading and image formation are controlled by a command from the main control unit 330. The main control unit 330 includes a central processing unit (CPU) 320 and a RAM 322. The RAM 322 provides a processing space used by the CPU 320 to process image data. Any CPUs that have been known can be used as the CPU 320; for example, a CISC (Complex Instruction Set Computer), such as the PENTIUM (registered trademark) series and a PENTIUM-compatible CPU, a RISC (Reduced Instruction Set Computer), such as the MIPS, and the like can be used. The CPU 320 receives an instruction from a user via an interface 328, and calls a program module for executing a process corresponding to the instruction to execute the process, such as copy, facsimile, scan, or image storage. The main control unit 330 further includes a ROM 324, and stores default setting data of the CPU 320, control data, a program, and the like in the ROM 324 so that the CPU 320 can use them. An image storage 326 is configured as a fixed or removable memory device, such as a hard disk device, an SD card, and a USB memory, and stores therein image data acquired by the image forming apparatus 100 so that the image data can be used for various processes instructed by a user.

When an image of image data acquired by the scanner unit 302 is output as an electrostatic latent image onto the photosensitive drum 104a or the like by driving the printer unit 308, the CPU 320 executes the main-scanning direction control and the sub-scanning position control of an image receiving medium, such as high-quality paper or a plastic film. To start scanning in the sub-scanning direction, the CPU 320 outputs a start signal to the GAVD 310. When the GAVD 310 receives the start signal, an IPU 306 starts a scanning process. After that, the GAVD 310 receives image data stored in a buffer memory or the like, and processes the received image data, and then outputs the processed image data to the LD driver 312. When receiving the image data from the GAVD 310, the LD driver 312 generates a drive control signal of the VCSEL 200. After that, the LD driver 312 sends the drive control signal to the VCSEL 200, thereby lighting up the VCSEL 200. Incidentally, the LD driver 312 drives the semiconductor laser elements by the use of the PWM control or the like. The VCSEL 200 described in the present embodiment includes eight channels of semiconductor laser elements; however, the number of channels of the VCSEL 200 is not limited to eight.

Figure 5:
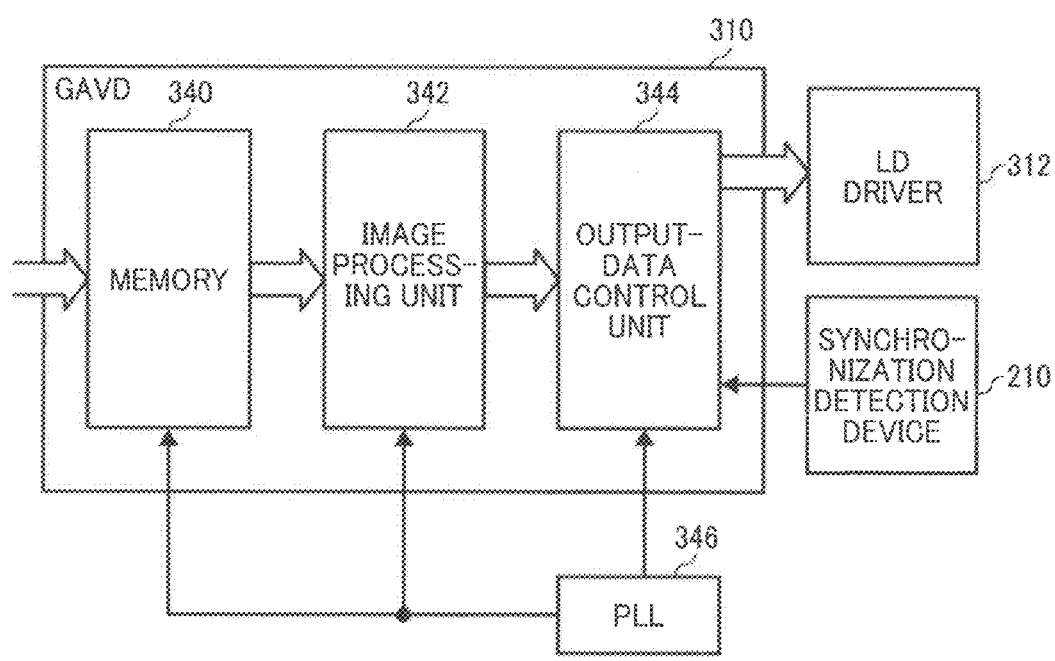
FIG. 5 is a detailed functional block diagram of a GAVD 310.

FIG. 5 is a detailed functional block diagram of the GAVD 310. The GAVD 310 receives a synchronization signal, and includes a memory 340 such as a FIFO buffer for storing and memorizing image data sent from the IPU 306, and passes the image data sent from the IPU 306 to an image processing unit 342 in a first-in first-out method. The image processing unit 342 reads out the image data from the memory 340, and executes a resolution conversion of the image data, assignment of the channel of the semiconductor laser element, and a process of adding/deleting an image bit (i.e., a correction pixel for scaling the image data up or down) (i.e., a correction process of the image data). The position on the photosensitive drum 104a exposed to a light beam corresponding to the image data is defined by a main-scanning line address value defining a line address value in the main-scanning direction and a sub-scanning line address value defining a line address value in the sub-scanning direction. Hereinafter, in the present embodiment, address coordinates are defined as a set of address values to which a specific image bit is given when image data is specified by a main-scanning line address value (an R address value) and a sub-scanning line address value (an F address value). Incidentally, as will be described below, these address values are determined by an address generating unit 354. Furthermore, address coordinates are set by each row of pixels aligned in each main-scanning line and each sub-scanning line. An image path selector 358 to be described below performs a correction process, such as insertion of an image bit, with respect to a pixel located at an address of coordinates specified by an R address value and an F address value which is determined by the address generating unit 354 to be described below (i.e., at a pixel position) by each row of pixels.

An output-data control unit 344 converts output data, which is a write signal corresponding to the image data generated by the image processing unit 342, into a time-series drive pulse on the basis of the F address value and the sub-scanning speed, and generates a synchronization control signal for giving a synchronization signal to a synchronization detection device 210, and adds the generated synchronization control signal to the drive pulse. The generated drive control signal is transmitted to the LD driver 312, and the VCSEL (not shown) is driven. Furthermore, the output-data control unit 344 receives a synchronization signal from the synchronization detection device 210, and synchronizes the transmission of the drive control signal to the LD driver 312. Incidentally, processes of the memory 340, the image processing unit 342, and the output-data control unit 344 are synchronized with an operation clock from a PLL 346.

Figure 6:
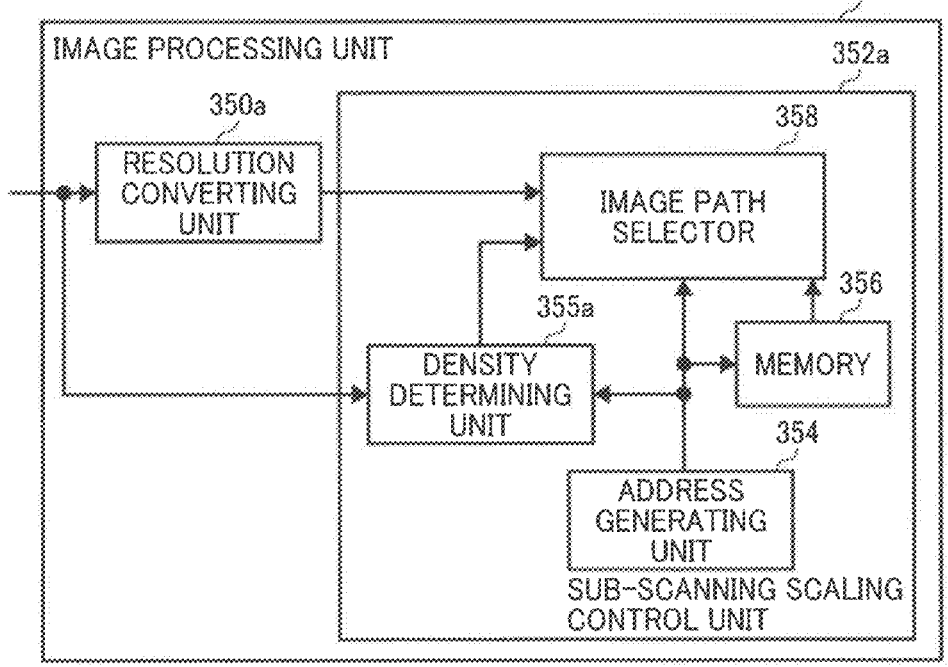

FIG. 6 is a functional block diagram of an image processing unit 342a according to the first embodiment. As shown in FIG. 6, the image processing unit 342a mainly includes a resolution converting unit 350a and a sub-scanning scaling control unit 352a.

The resolution converting unit 350a creates divided pixels by dividing a unit pixel of image data acquired from the memory 340 in the corresponding size and number of channels of the VCSEL 200. After that, the resolution converting unit 350a assigns the channels of the laser elements, which emit laser beams to respective pixels, to the divided pixels. Furthermore, in the case of increasing the resolution, the resolution converting unit 350a selects a 2n-fold density process (n is a positive integer) or a 2n-line process, and determines the assignment of the channel of the laser element to be driven. In this case, the resolution converting unit 350a determines synchronous writing of a 1200-dpi input image for a plurality of lines by the eight channels of the VCSEL at an output resolution of 4800 dpi.

Figure 7:
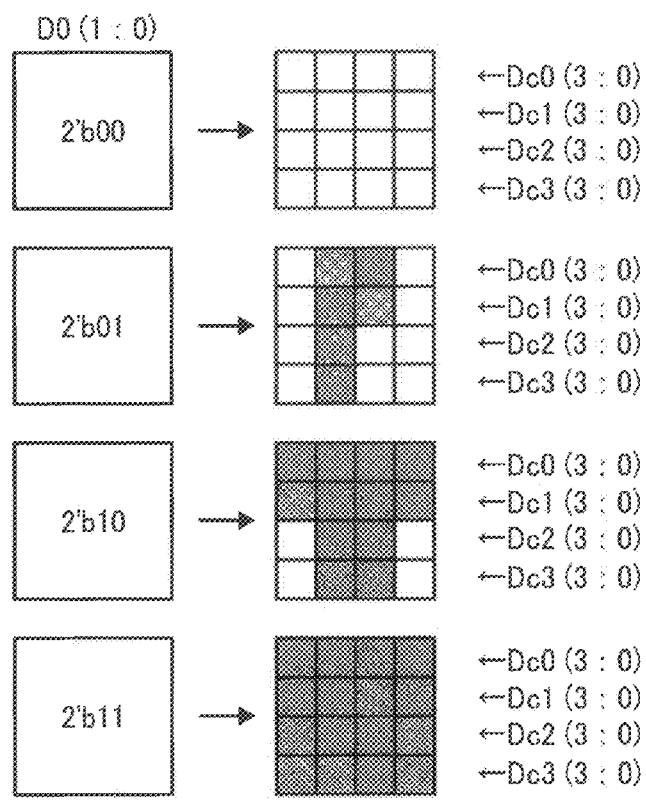

A resolution converting unit 350 converts input image data (hereinafter, referred to as "input data") into image data of a higher resolution (hereinafter, referred to as an "output resolution") than a resolution (hereinafter, referred to as an "input resolution") of an input image. FIG. 7 is a schematic diagram for explaining the resolution increasing process performed by the resolution converting unit 350. As shown in FIG. 7, the resolution converting unit 350 converts input data D0[1:0] illustrated on the left side of the diagram into output data Dc0[3:0] to Dc3[3:0] illustrated on the right side of the diagram depending on the density of the input data. In this case, the resolution converting unit 350 converts the input data D0[1:0] having an input resolution of 1200 dpi into the output data Dc0[3:0] to Dc3[3:0] having an output resolution of 4800 dpi. The resolution converting unit 350 processes other input data D1[1:0] to D5[1:0] in the same manner as the input data D0[1:0]. For example, the resolution converting unit 350 converts the input data D1[1:0] into output data Dc4[3:0] to Dc7[3:0].

The resolution converting unit 350a determines data causing the VCSEL 200 to be turned on from the input data. For example, when D0[1:0] to D5[1:0] for 6 lines are input data, it is assumed that D2[1:0] and D3[1:0] are attention lines and others are reference lines. When shift operation in a sub-scanning scaling process to be described below is not made, the resolution converting unit 350a sets the data causing the VCSEL 200 to be turned on as data of an attention line; on the other hand, when shift operation in the sub-scanning scaling process is made, the resolution converting unit 350a sets the data causing the VCSEL 200 to be turned on as reference image data.

The sub-scanning scaling control unit 352a mainly includes the address generating unit 354, a density determining unit 355a, a memory 356, and the image path selector 358.

The address generating unit 354 determines an adding address value indicating an address of image data to which an image bit is added in an image enlarging process. Incidentally, the address generating unit 354 corresponds to a position determining unit of the present invention.

The memory 356 stores therein a shift amount of an image bit, and counts and holds the number of scale command signals used in a scaling process performed by the image path selector 358 to be described below. Furthermore, the memory 356 holds density data. The density data here means data including the pixel density of a reference image, a shift amount of an additional pixel in converted image data, and the density of the additional pixel in an associated manner.

FIG. 8 is a diagram showing an example of the density data according to the first embodiment. As shown in FIG. 8, the density data includes the pixel density of a reference image, a shift amount of an additional pixel in the sub-scanning direction in converted image data (hereinafter, referred to as a "phase"), and the density of the additional pixel in an associated manner. An address of a pixel of the reference image corresponding to an adding address value may be associated with the density data in advance, or may be obtained by calculation. For example, in the case where the address of the pixel is obtained by calculation, since an F address determined by the address generating unit 354 is for a 4800-dpi pixel, an F address for a pixel having an input resolution of 1200 dpi is obtained by "F address(1200)=F address/4". Incidentally, the density of an additional pixel which is preliminarily determined in the density data shown in FIG. 8 may be determined as the same density as a corresponding pixel by the resolution conversion shown in FIG. 7, or may be determined as a different density.

Furthermore, a phase of a 1200-dpi pixel in the sub-scanning direction is "Phase=F address %4". Incidentally, "%" denotes a remainder. Incidentally, in the present embodiment, a phase is taken into consideration in determination of the density of an additional pixel; alternatively, the density of an additional pixel may be determined on the basis of only the density of a pixel of a reference image corresponding to an adding address value without taking a phase into consideration.

The density determining unit 355a determines the density of an additional pixel from an adding address value and the density of a pixel of a reference image corresponding to the adding address value. The reference image here means image data having an input resolution before being converted by the sub-scanning scaling control unit 352a. Furthermore, the additional pixel here means a pixel added to an address indicated by the adding address value.

For example, the density determining unit 355a specifies the density of a pixel of a reference image corresponding to an adding address value determined by the address generating unit 354 from the density data shown in FIG. 8, and obtains the density of a corresponding additional pixel. Incidentally, when the density determining unit 355a specifies the density of a pixel of a reference image corresponding to an adding address value, the density determining unit 355a may specify the densities of pixels of a reference image corresponding to an adding address value and around the adding address value (hereinafter, referred to as "surrounding pixels"). Furthermore, the surrounding pixels may be only pixels adjacent to the adding address value, or may be two to three rows of pixels around adding address values of both an R address value and an F address value.

Specifically, the density determining unit 355a determines the density of an additional pixel from an adding address value and the density of a pixel of a reference image corresponding to the adding address value. For example, the density determining unit 355a determines the same density as a pixel of a reference image corresponding to an adding address value as the density of an additional pixel.

The image path selector 358 scales the image data converted by the resolution converting unit 350a up or down. Specifically, the image path selector 358 obtains the determined adding address value (the F address value and the R address value) from the address generating unit 354. Furthermore, the image path selector 358 determines whether an address value subject to the process includes the adding address value. For example, when the address value subject to the process includes the adding address value, the image path selector 358 generates a scale command signal, such as an add flag, and passes the generated scale command signal to the memory 356.

When the image path selector 358 determines that the address value subject to the process includes the adding address value, i.e., when the scale command signal is set, the image path selector 358 adds an additional pixel having the density determined by the density determining unit 355a to the adding address value, and shifts the subsequent image data by 1 bit.

On the other hand, when the image path selector 358 determines that the address value subject to the process does not include the adding address value, i.e., when the scale command signal is not set, the image path selector 358 selects input data from the resolution converting unit 350a on the basis of a shift amount obtained from the memory 356, and outputs the selected input data. Incidentally, in the present embodiment, when the eight-channel VCSEL 200 is used as a semiconductor laser, signals each indicating the position where an image bit is to be added or deleted and signals each indicating a shift amount are assigned to the eight channels (ch0 to ch7), respectively, and are used to drive the VCSEL 200. Incidentally, an appropriate operating unit of the image processing unit 342 may be configured as a dedicated module for performing the addition/deletion of an image bit, or a part of another module may be configured to perform the addition/deletion of an image bit. Incidentally, the reason why it is configured to count the number of scale command signals is, when an image bit is shifted, to specify, for example, a position to which an image bit is first added in the second scanning after an image bit is added in the first scanning.

Figure 9A:
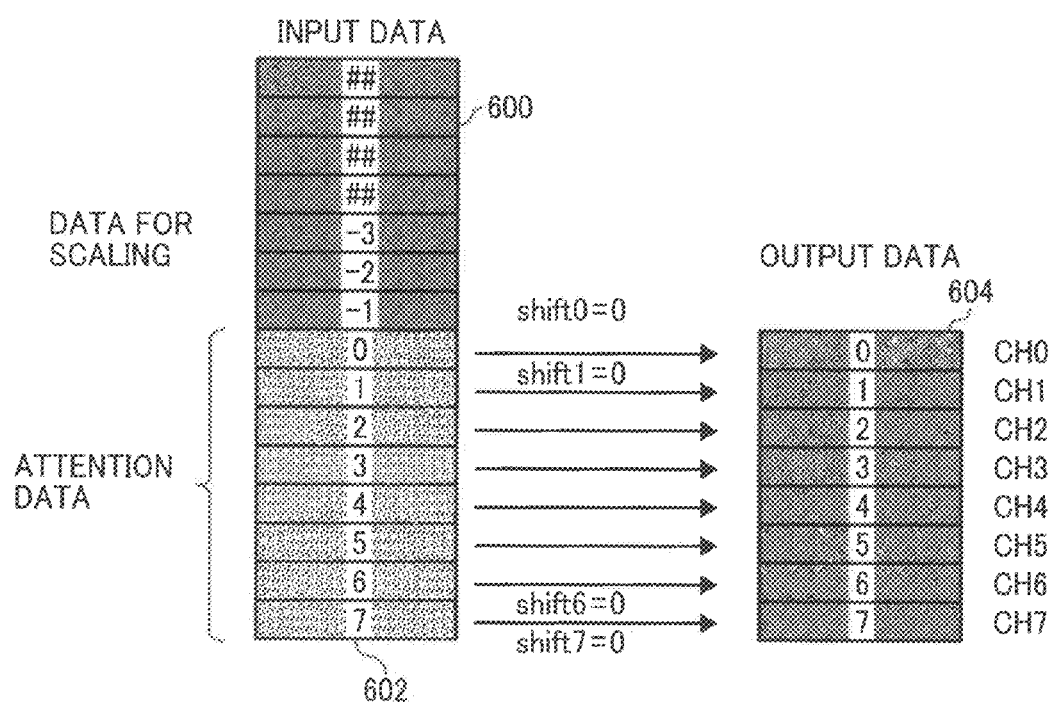
FIG. 9A is an explanatory diagrams illustrating operation of an image path selector 358.
Figure 9B:
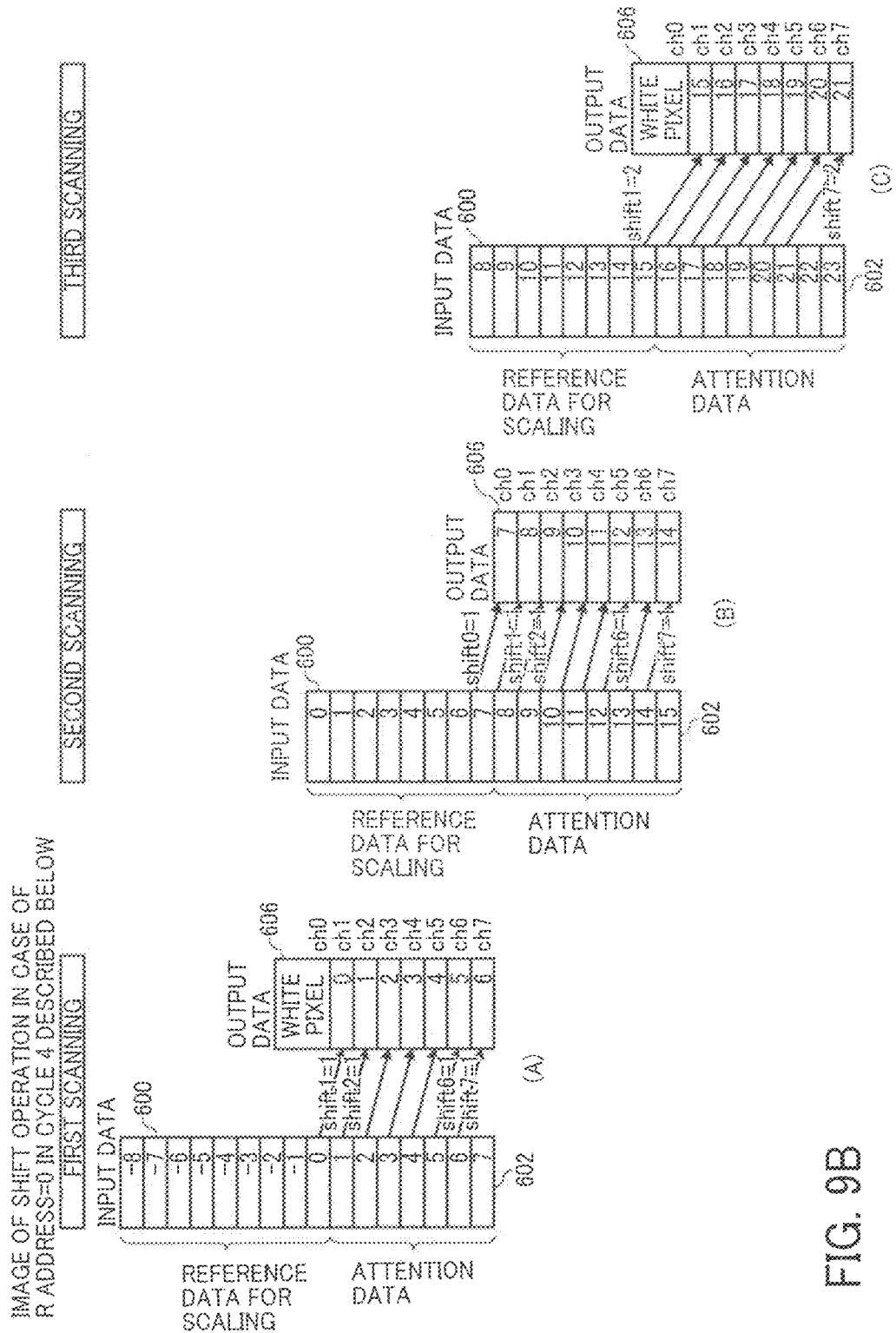
FIG. 9B is another explanatory diagrams illustrating the operation of the image path selector 358.

Subsequently, operation of the image path selector 358 is explained. FIGS. 9A and 9B are explanatory diagrams illustrating the operation of the image path selector 358. Attention data 602 shown in FIGS. 9A and 9B indicates a bit value for one pixel, and the 1-pixel data is represented in sub-coordinates for the eight channels. The attention data 602 is bit data assigned to a specific main-scanning coordinate position. As input data 600, the attention data 602 and scaling data for specifying a unit of shift for sub-scanning scaling are constantly read out from the memory 340 on the preceding stage, and after the same process is performed on all the lines, the data is input to the resolution converting unit 350. Since a scale command signal is not set when the scaling process shown in FIG. 9A is not yet performed, a shift amount obtained from the memory 356 holding the shift amount is zero (shift=0), and as shown in FIG. 9A, image data of the attention data 602 is passed as output data 604 which is a write signal in this embodiment.

Subsequently, the operation when a scale command signal is set is explained with reference to FIG. 9B. FIG. 9B shows a case where a white pixel is added to a sub-coordinate 1 of the attention data 602 in the first scanning (A). A signal indicating addition of an image bit is set with an address value corresponding to ch1, and bit data of ch1 is replaced so as to correspond to a white pixel and set as data in ch1 of output data 606. Then, a count value of 1 corresponding to the addition to ch1 is registered in the memory 356.

Data of ch2 to ch7 is each shifted to a sub-coordinate value by a channel shift amount of −1 as a value of a sub-coordinate of the output data 606. At this time, the image path selector 358 allocates bit data of the channel of the attention data corresponding to the channel shift amount of −1 to ch2 to ch7 of the output data 606, thereby adding an image bit. An image bit corresponding to white is added to the attention data in the output data 606, and the output data 606 is used as a write signal. The output-data control unit 344 converts the write signal in time series and generates a drive pulse for driving the VCSEL 200, and image formation is performed. The process described above is performed on a main-scanning basis, and data on the next pixel in the main-scanning direction is sequentially read out from the memory 340, and image formation in the main-scanning direction is performed.

As described above, in the first scanning (A), the sub-coordinate values of ch1 to ch7 of the output data 606 are shifted due to the addition of the white pixel; so in the second scanning (B), as shown in FIG. 9B, even when a white pixel is not added, sub-coordinate values are shifted by −1, and ch0 to ch7 of the output data 606 output the sub-coordinate values 7 to 14 respectively; furthermore, in the third scanning (C), when a white pixel is added in the same manner as in the first scanning, as shown in FIG. 9B, sub-coordinate values are shifted by −2.

Figure 10:
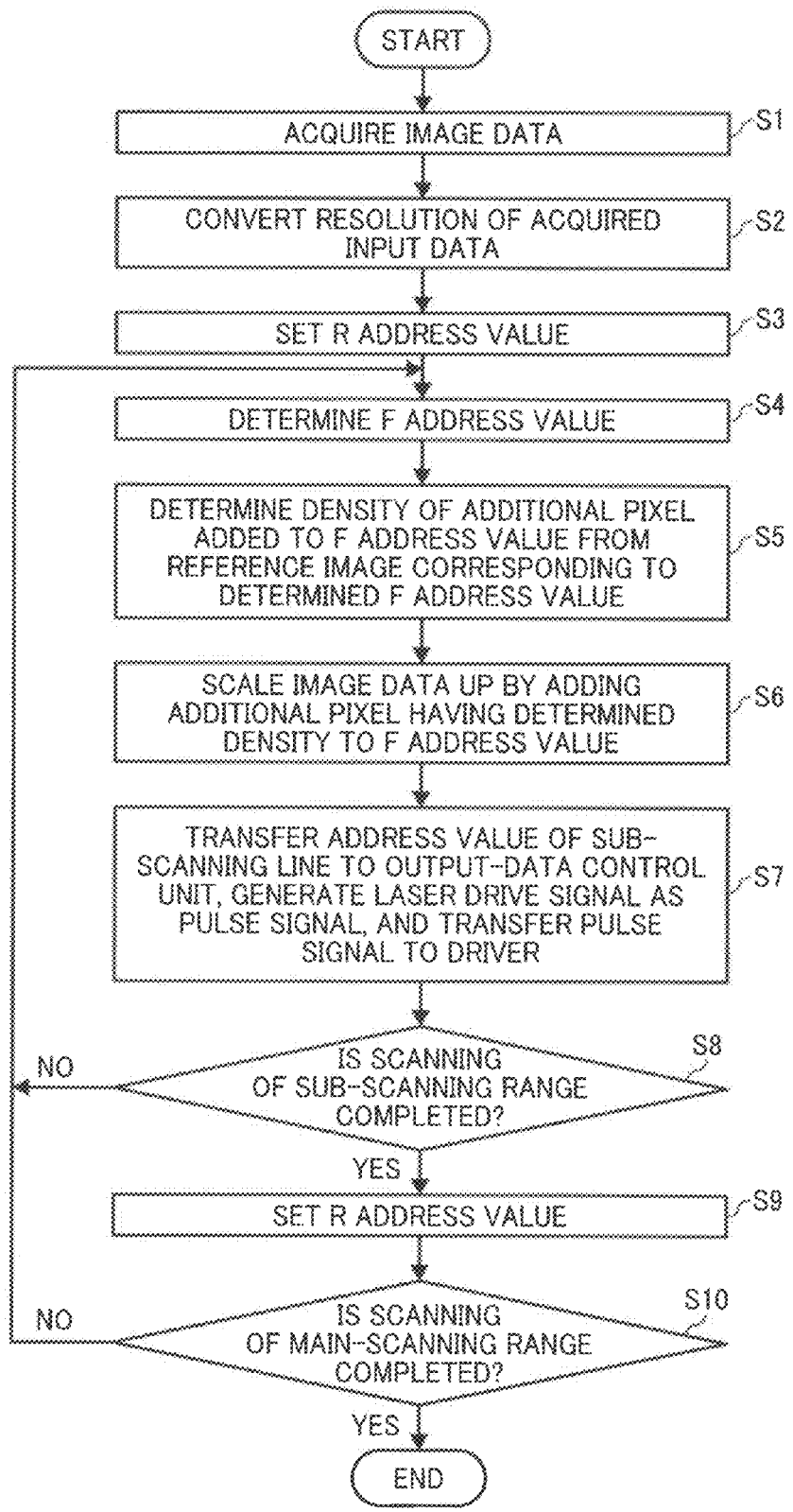

Subsequently, a procedure of an additional-pixel-density determining process performed by the image processing unit 342a configured as described above is explained. FIG. 10 is a flowchart showing the procedure of the additional-pixel-density determining process performed by the image processing unit 342a.

The resolution converting unit 350 acquires image data from the memory 340 as input data (Step S1). The resolution converting unit 350 converts the resolution of the acquired input data (Step S2). At this time, the resolution converting unit 350 converts the resolution of the acquired input data into an output resolution higher than the input resolution before the conversion. The address generating unit 354 sets an R address value (Step S3). The address generating unit 354 calculates an F address value from the R address value, and determines the F address value (Step S4). For example, the address generating unit 354 calculates an F address value using the R address value by a scaling method used in the image processing unit 342.

Then, a density determining unit 355 determines the density of an additional pixel added to the F address value from a reference image corresponding to the determined F address value (Step S5). The image path selector 358 scales the image data up by adding an additional pixel having the density determined by the density determining unit 355 to the F address (Step S6).

Then, the image path selector 358 reads out bit data corresponding to the F address value to be processed, and transfers the bit data to the output-data control unit 344 (Step S7). The output-data control unit 344 generates a timing pulse signal corresponding to the position of the pixel, and sends the timing pulse signal to the LD driver 312 to drive the semiconductor laser element.

Then, the image path selector 358 determines whether the transfer of image data in the range of a default F address assigned 1200 dpi is completed by comparing the F address or receiving an end character bit (Step S8). When the image path selector 358 determines that the scanning of the sub-scanning range is completed (YES at Step S8), the address generating unit 354 sets the next R address value (Step S9). After that, the image path selector 358 determines whether the scanning of a main-scanning range is completed (Step S10). When the image path selector 358 determines that the scanning of the range in the main-scanning direction is not completed (NO at Step S10), return to Step S4, the processes at Steps S4 to S10 are repeated.

On the other hand, at Step S8, when the image path selector 358 determines that the scanning of the sub-scanning range is not completed (NO at Step S8), return to Step S4, the processes at Steps S4 to S8 are repeated until the scanning of the range of the F address value is completed. At Step S10, when the image path selector 358 determines that the scanning of the address range to be eventually processed is completed (YES at Step S10), the process is terminated.

Figure 11:
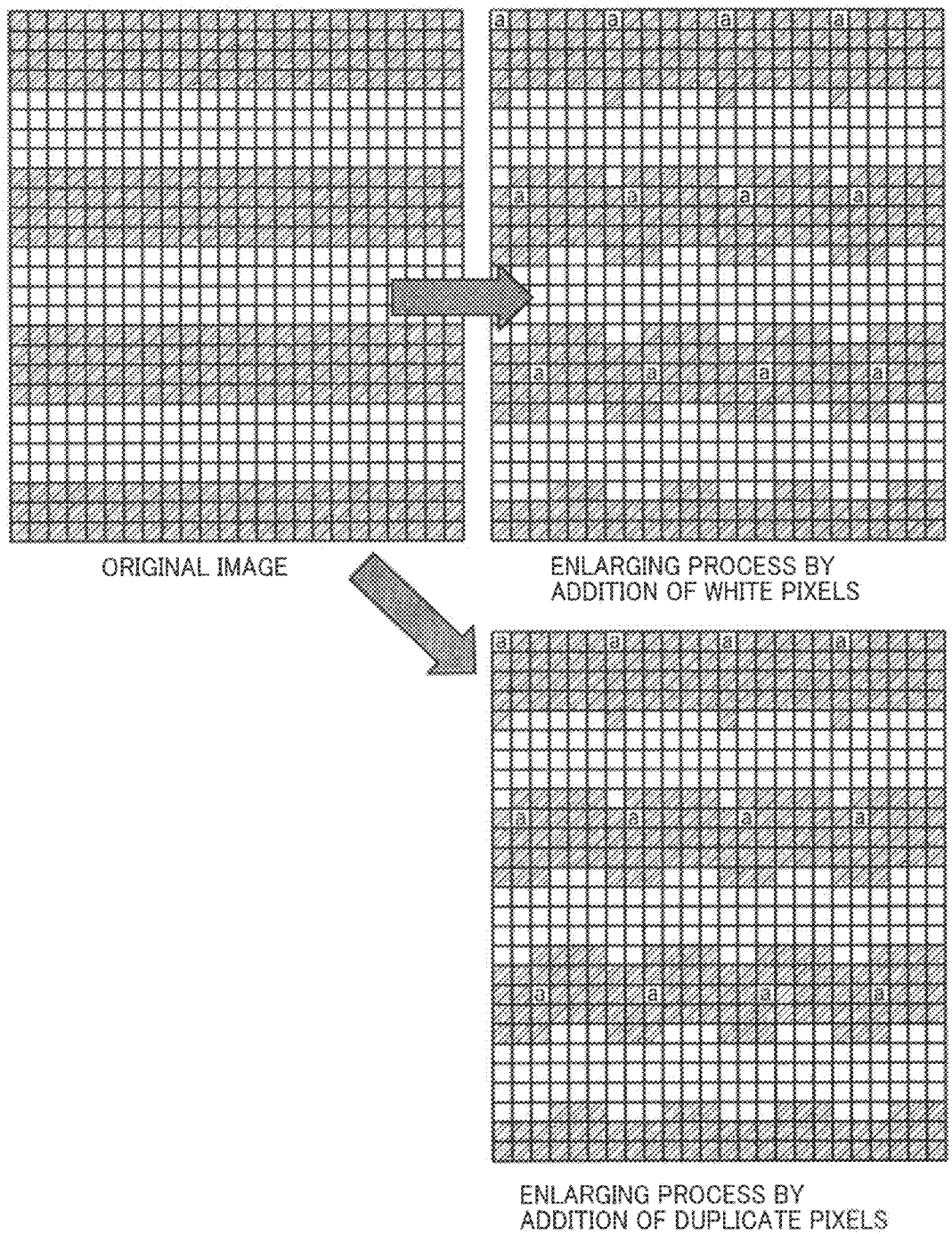
FIG. 11 is a diagram showing an example of original image data scanned by a scanner unit 302, image data enlarged by a conventional scaling process, and image data enlarged by a scaling process according to the present embodiment.

FIG. 11 is a diagram showing an example of original image data scanned by the scanner unit 302, image data enlarged by a conventional scaling process, and image data enlarged by a scaling process according to the present embodiment. As shown in the upper section of FIG. 11, in the conventional scaling process, the densities of additional pixels "a" are uniformly set as a white pixel, and the original image data is enlarged by adding white pixels to the original image data. Therefore, in the conventional scaling process, for example, when a white pixel is added to a black line, banding may appear on the image due to a decrease in the density. On the other hand, the lower section of FIG. 11 shows image data enlarged by the scaling process according to the present embodiment. As shown in FIG. 11, in the scaling process according to the present embodiment, the densities of additional pixels "a" are determined on the basis of the densities of pixels corresponding to respective adding address values, and the additional pixels are added. For example, an additional black pixel is added into black pixels, an additional halftone pixel is added into halftone pixels, and an additional white pixel is added into white data; therefore, banding becomes less prominent. Namely, according to the present embodiment, a high-quality image on which banding is barely prominent is obtained as compared with the image data enlarged by the conventional scaling process.

In this manner, according to the present embodiment, the density of an additional pixel is determined on the basis of the density of a pixel at an adding address value; therefore, it is possible to achieve formation of a high-resolution image at high speed even in duplex printing without causing global image deterioration and also possible to prevent the appearance of banding.

Second Embodiment

In the first embodiment, the density determining unit 355a determines the density of an additional pixel on the basis of the density of a pixel at an adding address value or the densities of pixels at an adding address value and around the adding address value. On the other hand, in a second embodiment, the density of an additional pixel is determined on the basis of an average value of the densities of pixels at an adding address value and around the adding address value.

Figure 12:
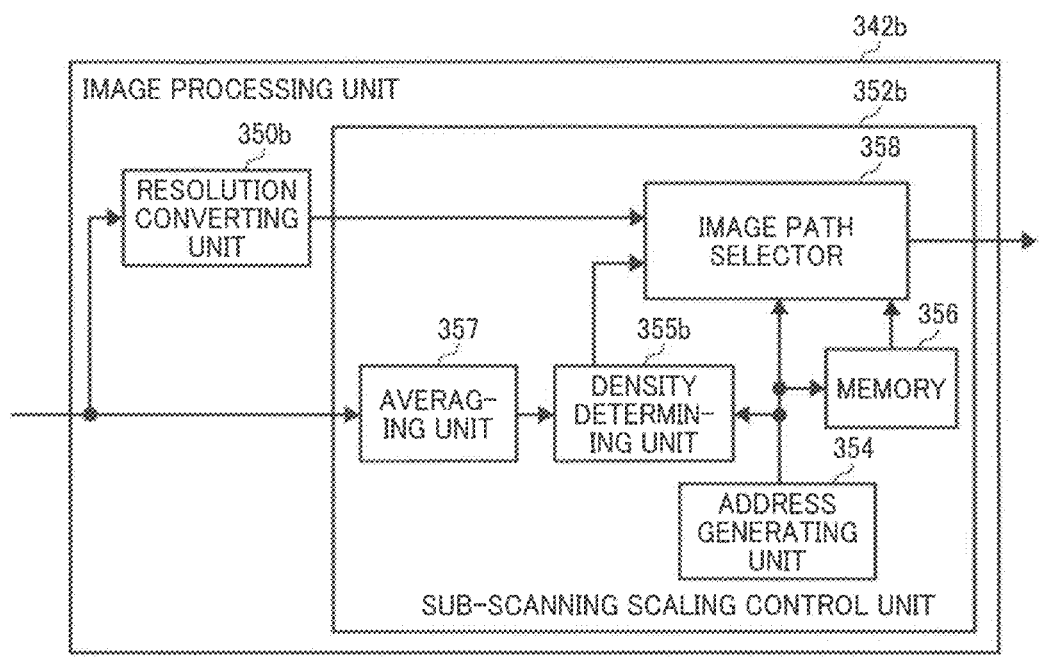
FIG. 12 is a functional block diagram of an image processing unit 342b according to a second embodiment.

FIG. 12 is a functional block diagram of an image processing unit 342b according to the second embodiment. As shown in FIG. 12, the image processing unit 342b mainly includes a resolution converting unit 350b and a sub-scanning scaling control unit 352b. The sub-scanning scaling control unit 352b mainly includes the address generating unit 354, a density determining unit 355b, an averaging unit 357, a memory 356, and the image path selector 358. The functions and configurations of the density determining unit 355b and the averaging unit 357 are explained here. Incidentally, the other units other than the density determining unit 355b and the averaging unit 357 have the same configuration and function as those in the first embodiment.

The averaging unit 357 acquires input data (a reference image) from the memory 340, and calculates an average value of the densities of a pixel to be converted and pixels around the pixel. The averaging unit 357 performs this average-value calculating process with respect to all the pixels.

Incidentally, to obtain the densities of the surrounding pixels, the averaging unit 357 acquires more input data than the input data acquired by the resolution converting unit 350a in the first embodiment. For example, the averaging unit 357 acquires data of extra 1 or more lines on both the sub-scanning front-end side and the sub-scanning back-end side additionally. For example, the averaging unit 357 acquires input data D6[1:0] and D7[1:0] in addition to the input data shown in FIG. 7. Namely, the input data D0 and D7 is acquired as reference data. Incidentally, input data acquired by the resolution converting unit 350 is the same data D1 to D6 as shown in FIG. 7.

Furthermore, the averaging unit 357 obtains the densities of a pixel to be converted and pixels around the pixel (hereinafter, referred to as "surrounding pixels") from a reference image, and calculates an average value of the densities. The surrounding pixels here may be only pixels adjacent to an adding address value, or may be two to three rows of pixels around adding address values of both an R address value and an F address value.

Figure 13:
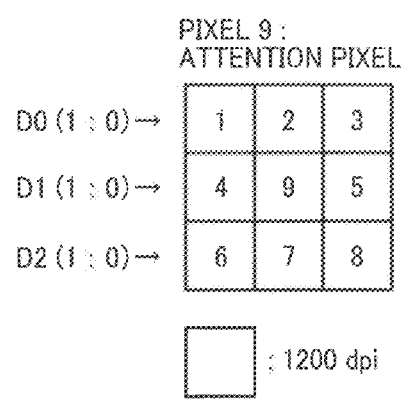
FIG. 13 is an explanatory diagram of operation of an averaging unit 357.

FIG. 13 is an explanatory diagram of operation of the averaging unit 357. As shown in FIG. 13, when a pixel 9 located at an adding address value is an attention pixel, and pixels 1 to 8 adjacent to the adding address value are surrounding pixels, the averaging unit 357 averages the densities of the pixels 1 to 9. Here, the densities that correspond to the pixels 1 to 9 are denoted by densities 1 to densities 9, respectively. Specifically, the density of an additional pixel is determined by the following equation (1). Incidentally, an obtained value is rounded off to the nearest whole number.

$$D0[1:0]=(\text{density 1}+\text{density 2}+\text{density 3}+\text{density 4}+\text{density 5}+\text{density 6}+\text{density 7}+\text{density 8}+\text{density 9})/9 \qquad (1)$$

The density determining unit 355b obtains the average values from the averaging unit 357, and determines a target average value out of the average values obtained from the address generating unit 354 on the basis of the adding address value as the density of an additional pixel.

An additional-pixel-density determining process is performed by the image processing unit 342b configured as described above. Incidentally, a procedure of the additional-pixel-density determining process according to the second embodiment is the same as that is in the first embodiment.

In this manner, according to the present embodiment, the density of an additional pixel is determined on the basis of the densities of pixels at an adding address value and around the adding address value; therefore, it is possible to achieve formation of a high-resolution image at high speed even in duplex printing without causing global image deterioration and also possible to prevent the appearance of banding.

Third Embodiment

In the first embodiment, the density of an additional pixel is determined on the basis of the density of a pixel of a reference image corresponding to an adding address value. On the other hand, in a third embodiment, a pixel located at an adding address value is converted into a predetermined code, and the density of an additional pixel is determined on the basis of the code.

FIG. 14 is a block diagram illustrating a functional configuration of an image processing unit 342c according to the third embodiment. As shown in FIG. 14, the image processing unit 342c mainly includes a resolution converting unit 350c and a sub-scanning scaling control unit 352c. The sub-scanning scaling control unit 352c mainly includes a density determining unit 355c, the address generating unit 354, the memory 356, and the image path selector 358. The function and configuration of the density determining unit 355c are explained here. Incidentally, the other units other than the density determining unit 355c have the same function and configuration as those in the first embodiment.

As shown in FIG. 14, the density determining unit 355c mainly includes a code generating unit 355x and a density generating unit 355y. The code generating unit 355x converts image data into code data corresponding to a predetermined code. FIG. 15 is a diagram showing an example of a pattern used in generation of a code by the code generating unit 355x. FIG. 15 shows three examples 1 to 3. As shown in FIG. 15, the center pixel of a 3×3 matrix is an attention pixel, and is a target pixel of which the code is to be output. In the present embodiment, the code is output with reference to the attention pixel and eight surrounding pixels around the attention pixel. When the pixels match a pattern of the example 1, a code of the target pixel is D1code[5:0]=1. When the pixels match a pattern of the example 2, a code of the target pixel is D1code[5:0]=2. When the pixels match a pattern of the example 3, a code of the target pixel is D1code[5:0]=3. Incidentally, the predetermined patterns may be preliminarily determined in the hardware configuration, or may be arbitrarily set.

Figures 16, 17:
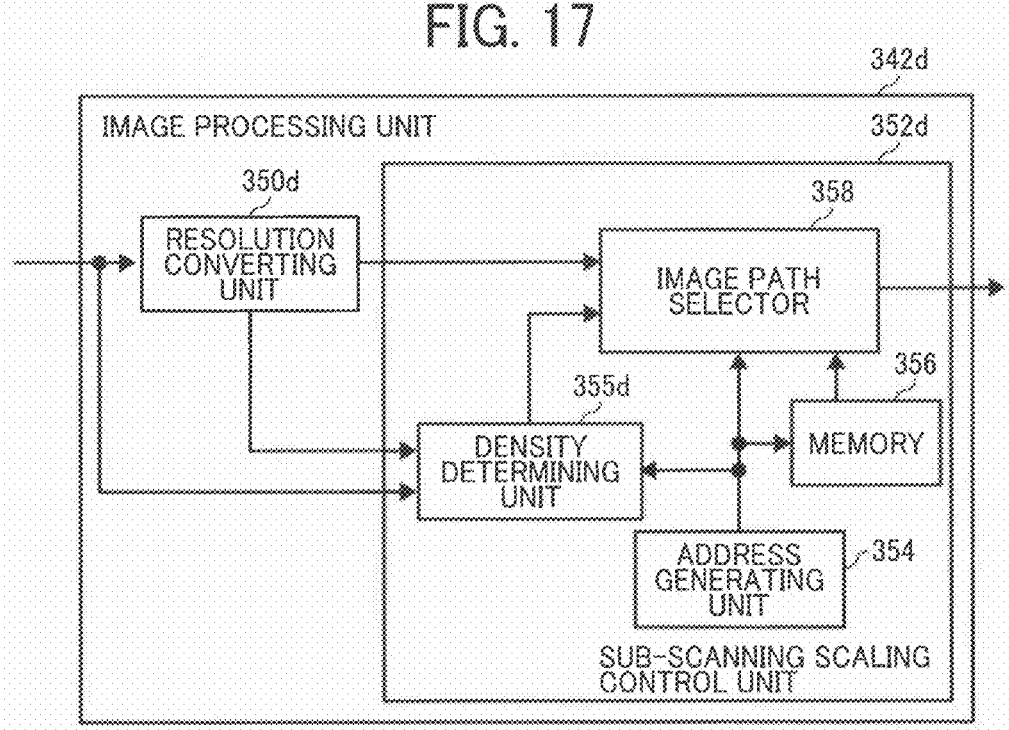
FIG. 16 is a diagram showing an example of density data according to the third embodiment.
FIG. 17 is a block diagram illustrating a functional configuration of an image processing unit 342d according to a fourth embodiment.

The density generating unit 355y determines the density of an additional pixel on the basis of the code converted by the code generating unit 355x and density data held in a memory 356. FIG. 16 is a diagram showing an example of the density data according to the third embodiment. As shown in FIG. 16, the density data includes a code, a phase, and the density of an additional pixel in an associated manner. For example, in the case of code[5:0]=02[hex] and phase=1, the density generating unit 355y outputs 4'b1110 as the density of an additional pixel. Furthermore, in the case of code[5:0]=02[hex] and phase=2, the density generating unit 355y outputs 4'b1000 as the density of an additional pixel. Moreover, in the case of code[5:0]=00[hex] regardless of phase, the density generating unit 355y outputs 4'b0000 as the density of an additional pixel. Incidentally, the density of an additional pixel in the density data may be preliminarily determined as the hardware configuration, or may be arbitrarily set.

An additional-pixel-density determining process is performed by the image processing unit 342c configured as described above. Incidentally, a procedure of the additional-pixel-density determining process is the same as that is in the first embodiment.

In this manner, according to the present embodiment, the density of an additional pixel is determined on the basis of the densities of pixels at an adding address value and around the adding address value; therefore, it is possible to achieve formation of a high-resolution image at high speed even in duplex printing without causing global image deterioration and also possible to prevent the appearance of banding.

Fourth Embodiment

In the first embodiment, the resolution converting unit 350 performs a conversion on the basis of an attention pixel of which the resolution is to be converted. On the other hand, in a fourth embodiment, if an attention pixel is halftone data, the resolution converting unit 350 converts the attention pixel so that black dots of the attention pixel are shifted toward a higher-density pixel out of pixels around the attention pixel.

FIG. 17 is a block diagram illustrating a functional configuration of an image processing unit 342d according to the fourth embodiment. As shown in FIG. 17, the image processing unit 342d mainly includes a resolution converting unit 350d and a sub-scanning scaling control unit 352d. The sub-scanning scaling control unit 352d mainly includes a density determining unit 355d, the address generating unit 354, the memory 356, and the image path selector 358. The functions and configurations of the resolution converting unit 350d and the density determining unit 355d are explained here. Incidentally, the other units other than the resolution converting unit 350d and the density determining unit 355d have the same function and configuration as those in the first embodiment.

The resolution converting unit 350d creates divided pixels by dividing a unit pixel of image data acquired from the memory 340 in the corresponding size and number of channels of the VCSEL 200. After that, the resolution converting unit 350d assigns the channels of the laser elements, which emit laser beams to respective pixels, to the divided pixels. Furthermore, in the case of increasing the resolution, the resolution converting unit 350d selects a 2n-fold density process (n is a positive integer) or a 2n-line process, and determines the assignment of the channel of the laser element to be driven. In this case, the resolution converting unit 350d determines synchronous writing of a 1200-dpi input image for a plurality of lines by the eight channels of the VCSEL at an output resolution of 4800 dpi.

The resolution converting unit 350d converts input data into image data of an output resolution higher than an input resolution. When an attention pixel is a halftone pixel indicating the density between those of a white pixel and a black pixel, with reference to pixels around the attention pixel, the resolution converting unit 350d converts the attention pixel so that black dots of the attention pixel are shifted toward a higher-density pixel out of the pixels around the attention pixel. When the black dots of the attention pixel are shifted, the resolution converting unit 350d passes shift information indicating a shift direction to the memory 356 and the density determining unit 355d as a signal phs[3:0]. The memory 356 can hold the signal phs[3:0] received from the resolution converting unit 350d to be associated with density data.

The detail of the shift information is explained here. FIG. 18 is an explanatory diagram showing an example of the shift information. As shown in FIG. 18, the resolution converting unit 350d obtains an attention pixel and pixels around the attention pixel. There are eight shift directions of shifting the attention pixel: leftward shift; rightward shift; upward shift; downward shift; left-upward shift; right-upward shift; left-downward shift; and right-downward shift. Incidentally, in FIG. 18, pixels adjacent to the attention pixel are obtained as pixels around the attention pixel; however, the pixels around the attention pixel are not limited to the adjacent pixels, and may be any other pixels as long as the pixels are located in the vicinity of the attention pixel.

Conditions for judgment of the shift direction include judgment of lateral shift on the basis of pixels located on the left and right sides of the attention pixel and judgment of longitudinal shift on the basis of pixels located on the upper and lower sides of the attention pixel. First, the judgment of lateral shift is made as follows:

a+b+c>f+g+h→leftward shift
a+b+c<f+g+h→rightward shift
a+b+c=f+g+h→no lateral shift Furthermore, the judgment of longitudinal shift is made as follows:

a+d+f>c+e+h→upward shift
a+d+f<c+e+h→downward shift
a+d+f=c+e+h→no longitudinal shift FIG. 19 is an explanatory diagram illustrating a shift conversion performed by the resolution converting unit 350d. In FIG. 19, 2'b00 denotes a white pixel, 2'b01 and 2'b10 denote halftone pixels, and 2'b11 denotes a black pixel. The resolution converting unit 350d converts the halftone pixels 2'b01 and 2'b10 as shown in FIG. 19 in accordance with a result of the shift judgment. Incidentally, a mode of conversion depending on the shift judgment may be configured to be fixed by hardware, or may be arbitrarily set by software.

The density determining unit 355d obtains a signal phs[3:0] from the resolution converting unit 350d, and determines the density of an additional pixel on the basis of the signal phs[3:0] and a phase value. For example, the density determining unit 355d determines the density of an additional pixel on the basis of density data. FIG. 20 is a diagram showing an example of the density data according to the fourth embodiment. As shown in FIG. 20, in the halftone pixel 2'b01 shown in FIG. 19, a signal phs[3:0] and a phase value are associated with the density of an additional pixel. Furthermore, as shown in FIG. 20, with respect to the white pixel 2'b00 and the black pixel 2'b11 shown in FIG. 19, the density of an additional pixel set regardless of signal phs[3:0] and phase value is determined. Here, the same phase as in the resolution conversion shown in FIG. 19 is assigned.

An additional-pixel-density determining process is performed by the image processing unit 342d configured as described above. Incidentally, a procedure of the additional-pixel-density determining process performed by the image processing unit 342d is the same as that is in the first embodiment.

In this manner, according to the present embodiment, the density of an additional pixel is determined on the basis of the densities of pixels at an adding address value and around the adding address value; therefore, it is possible to achieve formation of a high-resolution image at high speed even in duplex printing without causing global image deterioration and also possible to prevent the appearance of banding.

Fifth Embodiment

In the fourth embodiment, the resolution converting unit 350d converts a halftone pixel by a shift process. On the other hand, in a fifth embodiment, a resolution converting unit 350e converts a halftone pixel on the basis of dither information.

Figure 21:
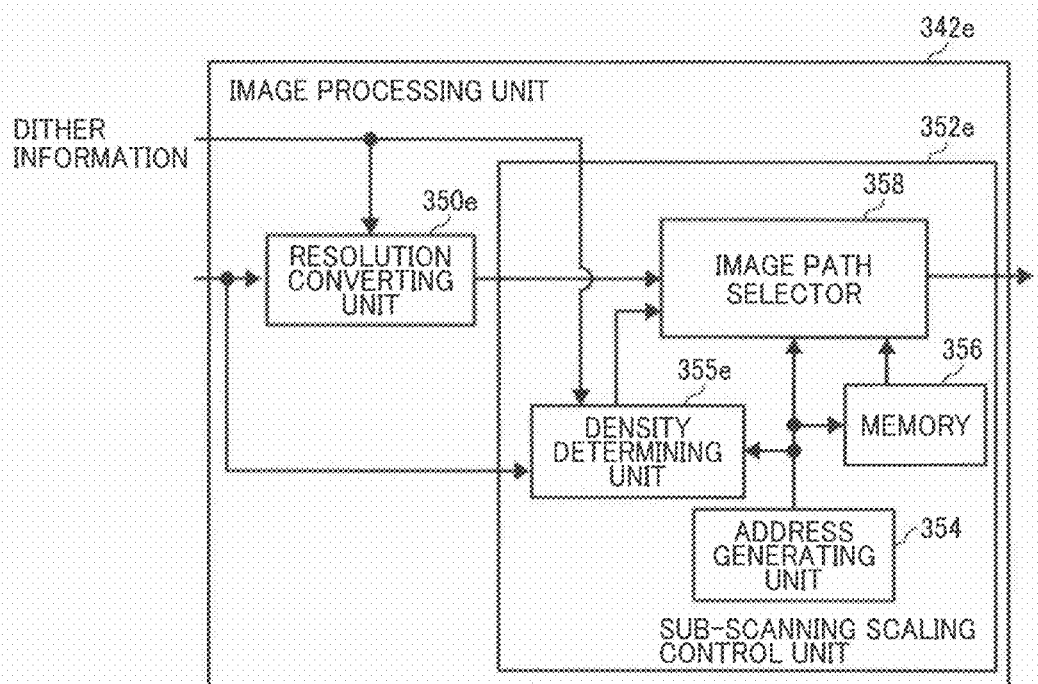
FIG. 21 is a block diagram illustrating a functional configuration of an image processing unit 342e according to a fifth embodiment.

FIG. 21 is a block diagram illustrating a functional configuration of an image processing unit 342e according to the fifth embodiment. As shown in FIG. 21, the image processing unit 342e mainly includes the resolution converting unit 350e and a sub-scanning scaling control unit 352e. The sub-scanning scaling control unit 352e mainly includes a density determining unit 355e, the address generating unit 354, the memory 356, and the image path selector 358. The functions and configurations of the resolution converting unit 350e and the density determining unit 355e are explained here. Incidentally, the other units other than the resolution converting unit 350e and the density determining unit 355e have the same function and configuration as those in the first embodiment.

The resolution converting unit 350e acquires image data and dither information on dithering performed on the image data from the memory 340. The resolution converting unit 350e creates divided pixels by dividing a unit pixel of the acquired image data in the corresponding size and number of channels of the VCSEL 200. After that, the resolution converting unit 350e assigns the channels of the laser elements, which emit laser beams to respective pixels, to the divided pixels. Furthermore, in the case of increasing the resolution, the resolution converting unit 350e selects a 2n-fold density process (n is a positive integer) or a 2n-line process, and determines the assignment of the channel of the laser element to be driven. In this case, the resolution converting unit 350e determines synchronous writing of a 1200-dpi input image for a plurality of lines by the eight channels of the VCSEL at an output resolution of 4800 dpi.

The resolution converting unit 350e converts input data into image data of an output resolution higher than an input resolution. When an attention pixel is a halftone pixel, the resolution converting unit 350e performs a conversion on the basis of the dither information. For example, dither information for each color plate is set in advance. This set value may be changed by software or an application on a PC.

Figure 22:
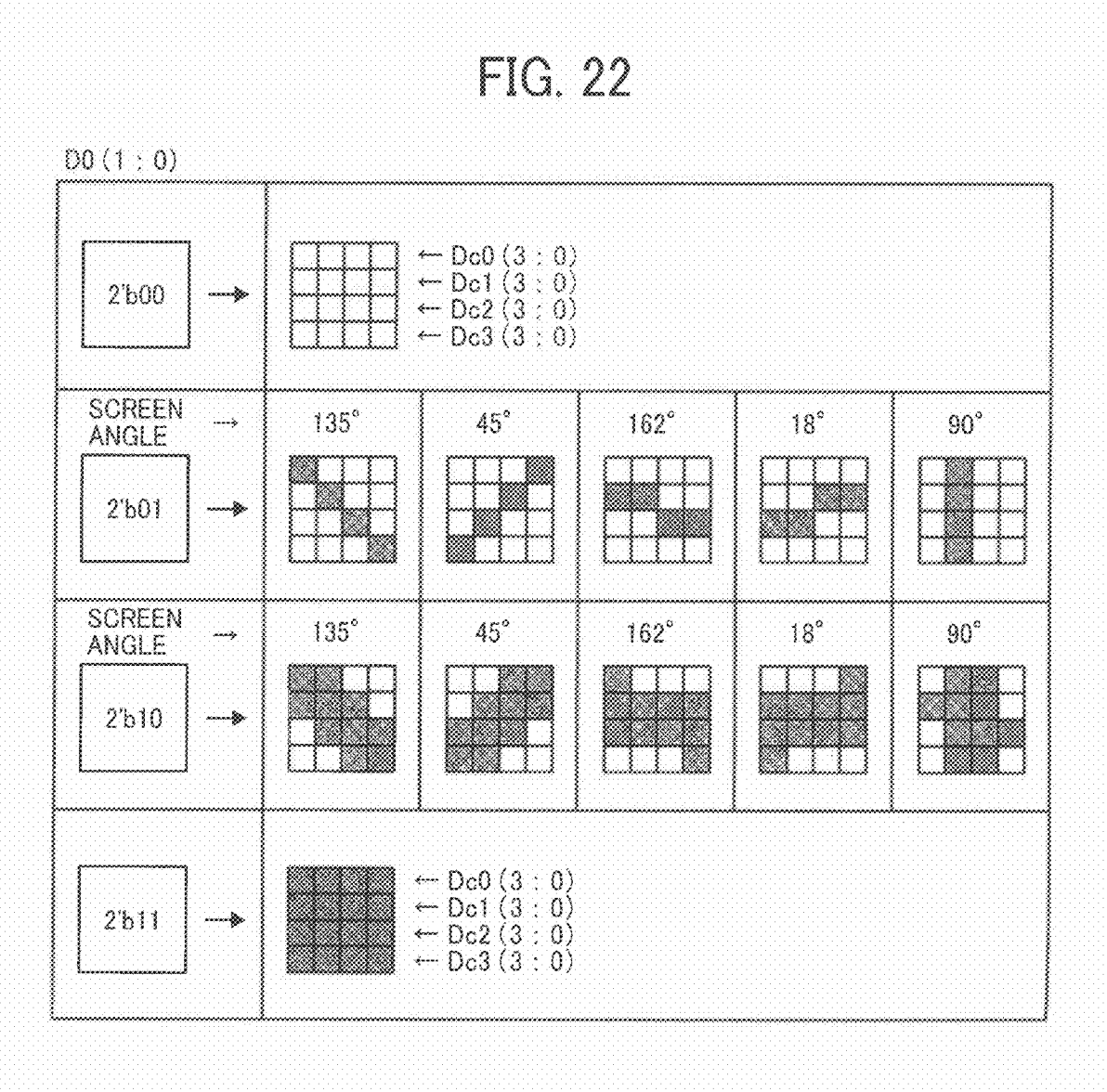

FIG. 22 is an explanatory diagram showing an example of designation of pixel arrangement based on dither information. For example, the dither information includes a screen angle, and a set value depending on the screen angle is preliminarily determined as shown in FIG. 22. As an example, when a screen angle of a pixel 2'b01 is 135°, the resolution converting unit 350e converts the pixel into the arrangement as shown in FIG. 22. Furthermore, as shown in FIG. 22, dither information is taken into consideration in the resolution conversion of a halftone pixel only; dither information is not taken into consideration in the resolution conversion of a white pixel 2'b00 and a black pixel 2'b11.

The density determining unit 355e determines the density of an additional pixel on the basis of dither information and the density of a pixel of a reference image corresponding to an adding address value. With respect to a halftone pixel, the density determining unit 355e acquires dither information from the memory 340, and determines the density of an additional pixel on the basis of image data, the dither information, and an adding address value obtained from the address generating unit 354. Furthermore, with respect to a pixel other than a halftone pixel, i.e., a white pixel and a black pixel, the density determining unit 355e determines the density of a pixel at an adding address value as the density of an additional pixel without taking dither information into consideration.

FIG. 23 is a diagram showing an example of density data according to the fifth embodiment. As shown in FIG. 23, the density data includes dither information, a phase, and the density of an additional pixel in an associated manner. For example, when dither information of a halftone pixel 2'b01 indicates a screen angle of 135°, and a phase of the halftone pixel 2'b01 is 1, the density determining unit 355e determines 4'b0100 as the density of an additional pixel. Incidentally, as shown in FIG. 23, with respect to a white pixel 2'b00 and a black pixel 2'b11, the density determining unit 355e does not take dither information and a phase into consideration.

Figure 24:
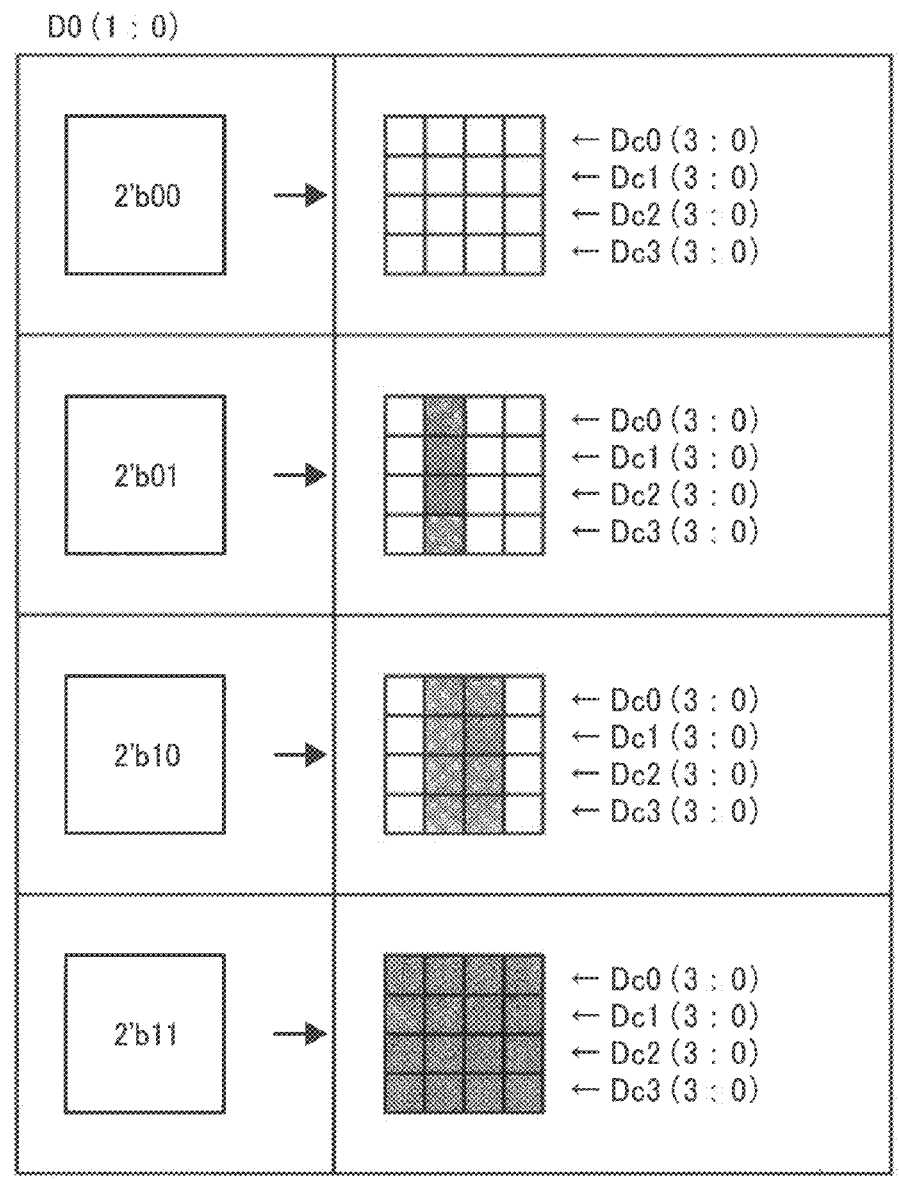
FIG. 24 is an explanatory diagram showing an example of conversion into a longitudinal-based density.

Subsequently, another example of the methods for resolution conversion and determination of the density of an additional pixel performed with respect to a halftone pixel are explained. First, instead of the conversion of a halftone pixel based on dither information as described above, the resolution converting unit 350e can convert the density of a halftone pixel into a longitudinal-based density. The conversion into the longitudinal-based density here means to arrange black dots of a halftone pixel, which is an attention pixel, to be aligned in the sub-scanning direction. FIG. 24 is an explanatory diagram showing an example of the conversion into the longitudinal-based density. As shown in FIG. 24, the resolution converting unit 350e arranges respective black dots of halftone pixels 2'b01 and 2'b10 to be aligned longitudinally, i.e., in the sub-scanning direction. Incidentally, the densities of longitudinally-arranged pixels Dc0[3:0] to Dc3[3:0] can be either all the same data or different data from one another. However, in the case of different data, a difference between the data is preferably as small as possible to avoid banding. Furthermore, the resolution converting unit 350e may perform the shift process in the conversion into the longitudinal-based density.

Figures 25, 26:
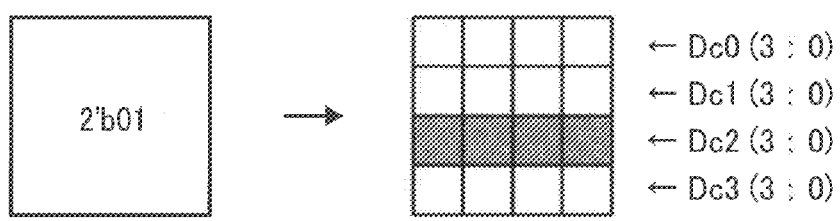
FIG. 25 is a diagram showing another example of the density data.
FIG. 26 is a diagram showing an example of conversion into a lateral-based density.

The density determining unit 355e determines the density of an additional pixel on the basis of the data converted into the longitudinal-based density by the resolution converting unit 350e and a phase. Incidentally, the density determining unit 355e can determine the density of an additional pixel directly from the data converted into the longitudinal-based density without taking a phase into consideration. In this case, as shown in FIG. 25, with respect to all of the white pixel 2'b00, the halftone pixels 2'b01 and 2'b10, and the black pixel 2'b11, the density of each pixel is determined as the density of an additional pixel regardless of phase. In this case, the density determining unit 355e can determine the density of the additional pixel without taking a phase of the adding position into consideration, so the circuit size can be reduced.

Incidentally, if the resolution converting unit 350e converts the density of a halftone pixel into the lateral-based density, i.e., converts a halftone pixel so that black dots of the halftone pixel are aligned in the main-scanning direction as shown in FIG. 26, for example, when Dc2[3:0] is deleted, the density varies greatly. Consequently, the resolution converting unit 350e converts the density of a halftone pixel into the longitudinal-based density, and this can make banding less prominent than in the case of the conversion into the lateral-based density.

An additional-pixel-density determining process is performed by the image processing unit 342e configured as described above. Incidentally, a procedure of the additional-pixel-density determining process performed by the image processing unit 342e is the same as that is in the first embodiment.

In this manner, according to the present embodiment, the density of an additional pixel is determined on the basis of the densities of pixels at an adding address value and around the adding address value; therefore, it is possible to achieve formation of a high-resolution image at high speed even in duplex printing without causing global image deterioration and also possible to prevent the appearance of banding.

Furthermore, in the present embodiment, the density of an additional pixel is determined on the basis of dither information; therefore, it is possible to reduce the adverse effects on not only a line screen but also a dithered image.

Moreover, in the present embodiment, the conversion is made on the basis of the longitudinal-based density; therefore, it is possible to simplify the circuit configuration and reduce the circuit size.

Figure 27:
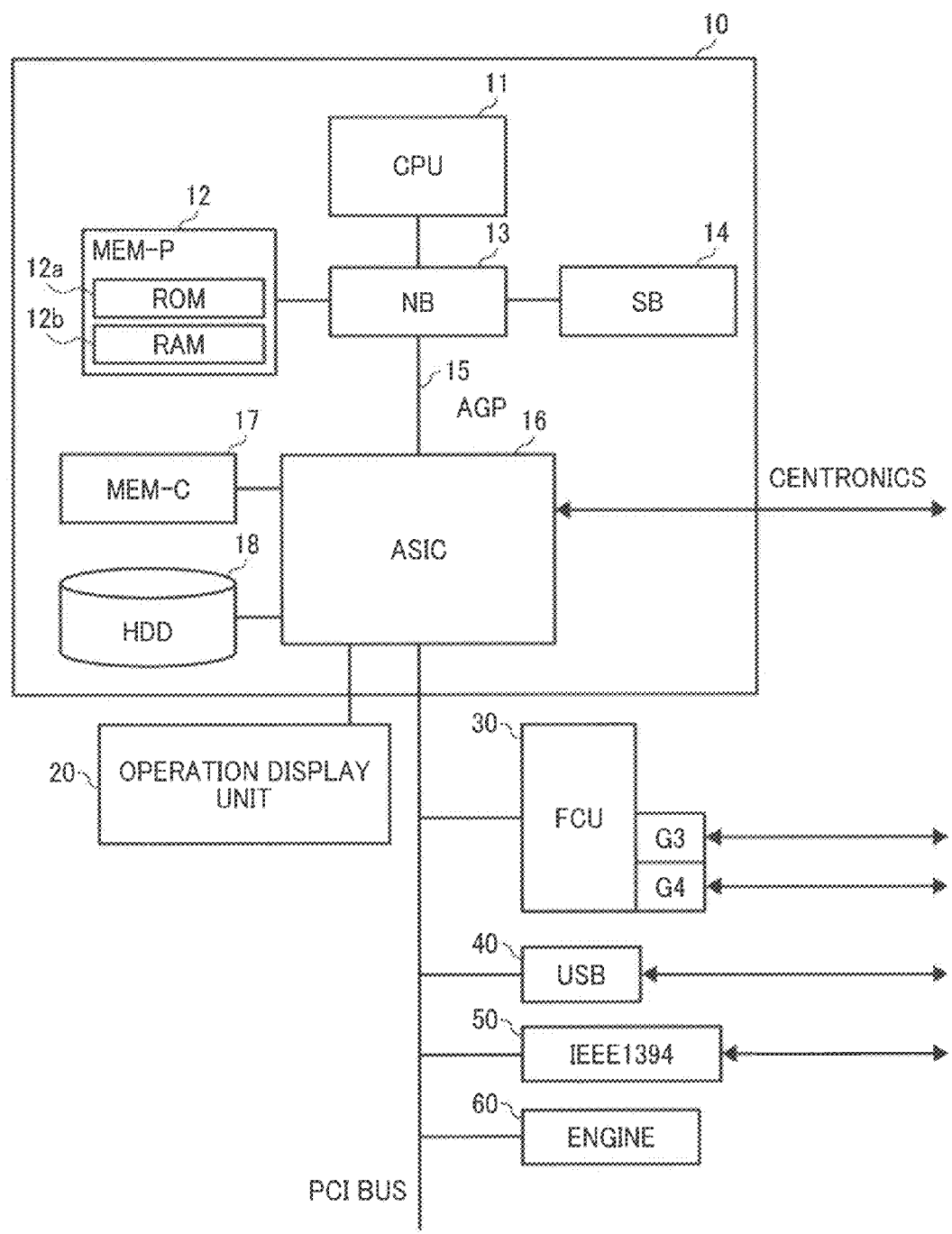
FIG. 27 is a block diagram illustrating a hardware configuration of the image forming apparatus 100.

FIG. 27 is a block diagram illustrating a hardware configuration of the image forming apparatus 100. As shown in FIG. 27, the image forming apparatus 100 (hereinafter, referred to as the "MFP 100") includes a controller 10 and an engine unit 60. The controller 10 and the engine unit 60 are connected by a PCI (Peripheral Component Interface) bus. The controller 10 is a controller which controls the entire MFP 100 and controls drawing, communications, and the input from an operating unit (not shown). The engine unit 60 is a printer engine which can be connected to the PCI bus, etc. For example, the engine unit 60 is a black-and-white plotter, a 1-drum color plotter, a 4-drum color plotter, a scanner, a facsimile unit, or the like. Incidentally, the engine unit 60 includes an image processing section for performing error diffusion, gamma conversion, or the like on an image in addition to the so-called engine section, such as a plotter.

The controller 10 includes a CPU 11, a North Bridge (NB) 13, a system memory (MEM-P) 12, a South Bridge (SB) 14, a local memory (MEM-C) 17, an ASIC (Application Specific Integrated Circuit) 16, and a hard disk drive (HDD) 18. The NB 13 and the ASIC 16 are connected by an AGP (Accelerated Graphics Port) bus 15. The MEM-P 12 includes a ROM (Read Only Memory) 12a and a RAM (Random Access Memory) 12b.

The CPU 11 controls the entire MFP 100, and has a chipset composed of the NB 13, the MEM-P 12, and the SB 14. The CPU 11 is connected to other devices via the chipset.

The NB 13 is a bridge for connecting the CPU 11 to the MEM-P 12, the SB 14, and the AGP bus 15, and includes a memory controller for controlling read/write with respect to the MEM-P 12 and the like, a PCI master, and an AGP target.

The MEM-P 12 is a system memory used as a memory for storing a program or data, a memory for unpacking the program or data, a memory for drawing by a printer, and the like, and is composed of the ROM 12a and the RAM 12b. The ROM 12a is a read only memory used as a memory for storing a program or data. The RAM 12b is a read-write memory used as a memory for unpacking the program or data, a memory for drawing by a printer, and the like.

The SB 14 is a bridge for connecting the NB 13 to a PCI device and a peripheral device. The SB 14 is connected to the NB 13 via the PCI bus, and, for example, a network interface (I/F) is connected to the PCI bus. A network interface (I/F) unit and the like are connected to the PCI bus.

The ASIC 16 is an image processing IC (Integrated Circuit) including hardware components for image processing. The ASIC 16 serves as a bridge for connecting the AGP bus 15, the PCI bus, the HDD 18, and the MEM-C 17. The ASIC 16 is composed of a PCI target, an AGP master, an arbiter (ARB) which is the core of the ASIC 16, a memory controller for controlling the MEM-C 17, a plurality of DMACs (Direct Memory Access Controllers) for performing rotation of image data or the like by a hardware logic, and a PCI unit for performing data transfer between the controller 10 and the engine unit 60 via the PCI bus. An FCU (Facsimile Control Unit) 30, a USB (Universal Serial Bus) 40, and an IEEE 1394 (the Institute of Electrical and Electronics Engineers 1394) interface 50 are connected to the ASIC 16 via the PCI bus. An operation display unit 20 is directly connected to the ASIC 16.

The MEM-C 17 is a local memory used as a copy image buffer and a code buffer. The HDD 18 is a storage for storing therein image data, a program, font data, and a form.

The AGP bus 15 is a bus interface for a graphic accelerator card proposed to speed up a graphics operation, and accelerates the graphic accelerator card by directly accessing the MEM-P 12 at high throughput.

According to the present invention, it is possible to achieve formation of a high-resolution image at high speed even in duplex printing without causing global image deterioration and also possible to prevent the appearance of banding.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an image-data acquiring unit that acquires image data composed of a plurality of pixels;
    a storage unit that stores a position in the image data and a density of each of the plurality of pixels;
    a resolution converting unit that converts a resolution of the image data into converted image data with a higher resolution than the resolution of the image data;
    a position determining unit that performs a position determining process of determining a position of an additional pixel to be added on the basis of main-scanning directional positions of pixels composing the converted image data and respective shift amounts of pixels of the converted image data shifted in a sub-scanning direction from the main-scanning directional positions;
    a density determining unit that determines a density of the additional pixel based on a density of a pixel of the plurality of pixels located at a respective position in the image data which is stored in the storage unit and corresponds to the position of the additional pixel;
    a correcting unit that performs a correction process of adding the additional pixel to the converted image data; and
    a scaling unit that controls the position determining unit and the correcting unit so as to scale the converted image data up or down by causing the position determining unit and the correcting unit to repeatedly perform the position determining process and the correction process with respect to each of sub-scanning lines of pixels and then repeatedly perform the position determining process and the correction process with respect to each of main-scanning lines of pixels;

wherein the pixel of the plurality of pixels located at the respective position in the image data which is stored in the storage unit and corresponds to the position of the additional pixel is a pixel of a reference image.

2. The image forming apparatus according to claim 1, wherein the density determining unit determines the density of the additional pixel is further based on respective densities of pixels in the plurality of pixels located at positions in the image data around the respective position of the pixel of the reference image.

3. The image forming apparatus according to claim 2, wherein the density determining unit calculates an average value of the respective densities of the pixels in the plurality of pixels and the pixel of the reference image and determines the average value as the density of the additional pixel.

4. The image forming apparatus according to claim 2, wherein the storage unit stores therein a plurality of predetermined patterns associated with density values, wherein the density determining unit includes a pattern obtaining unit that obtains a reference pattern of the pixel of the reference image and pixels in the plurality of pixels located at the positions in the image data around the pixel of the reference image, and wherein the density determining unit determines whether the reference pattern matches any of the plurality of predetermined patterns obtains a density value from the storage unit associated with a pattern matching the reference pattern, and determines the density value as the density of the additional pixel.

5. The image forming apparatus according to claim 4, wherein the density determining unit further comprises an input receiving unit that receives input of the density value and the pattern matching the reference pattern, wherein the storage unit stores therein the density value and the pattern matching the reference pattern of which the input is received in an associated manner.

6. The image forming apparatus according to claim 1, wherein the density determining unit determines a predetermined density according to the density of the pixel of the reference image and a shift amount of the additional pixel shifted in the sub-scanning direction as the density of the additional pixel.

7. The image forming apparatus according to claim 1, wherein with respect to a halftone pixel out of the plurality of pixels of the image data, the resolution converting unit further converts the halftone pixel so that in a corresponding converted halftone pixel black dots in the image data of the halftone pixel are shifted toward a high-density pixel out of a plurality of pixels around the halftone pixel, and the density determining unit obtains shift information indicating a shift direction of the halftone pixel from the resolution converting unit, and determines the density of the additional pixel based on the shift information and the density of the pixel of the reference image.

8. The image forming apparatus according to claim 1, wherein the image-data acquiring unit further acquires dither information of the image data, with respect to a halftone pixel out of the plurality of pixels of the image data, the resolution converting unit further converts the resolution on the basis of the dither information, and with respect to the halftone pixel, the density determining unit determines the density of the additional pixel on the basis of the dither information and the density of the pixel of the reference image.

9. The image forming apparatus according to claim 1, wherein with respect to a halftone pixel out of the plurality of pixels of the image data, the resolution converting unit converts the halftone pixel so that black dots of the halftone pixel are arranged to be aligned in the sub-scanning direction in a corresponding converted halftone pixel.

10. An image forming method comprising:

acquiring image data composed of a plurality of pixels;

storing a position in the image data and a density of each of the plurality of pixels;

converting a resolution of the image data into converted image data with a higher resolution than the resolution of the image data;

performing a position determining process of determining a position of an additional pixel to be added on the basis of main-scanning directional positions of pixels composing the converted image data and respective shift amounts of pixels of the converted image data shifted in a sub-scanning direction from the main-scanning directional positions;

determining a density of the additional pixel based on a density of a pixel of the plurality of pixels located at a respective position in the image data which is stored and corresponds to the position of the additional pixel;

performing a correction process of adding the additional pixel to the converted image data; and scaling the converted image data up or down by repeatedly performing the position determining process and the correction process with respect to each of sub-scanning lines of pixels and then repeatedly performing the position determining process and the correction process with respect to each of main-scanning lines of pixels by controlling a position determining unit and a correcting unit, wherein the pixel of the plurality of pixels located at the respective position in the image data which is stored and corresponds to the position of the additional pixel is a pixel of a reference image.

11. An image forming apparatus comprising:

an image-data acquiring means for acquiring image data composed of a plurality of pixels;

a storage means for storing a position in the image data and a density of each of the plurality of pixels;

a resolution converting means for converting a resolution of the image data into converted image data with a higher resolution than the resolution of the image data;

a position determining means for performing a position determining process of determining a position of an additional pixel to be added on the basis of main-scanning directional positions of pixels composing the converted image data and respective shift amounts of pixels of the converted image data shifted in a sub-scanning direction from the main-scanning directional positions;

a density determining means for determining a density of the additional pixel based on a density of a pixel of the plurality of pixels located at a respective position in the image data which is stored in the storage means and corresponds to the position of the additional pixel;

a correcting means for performing a correction process of adding the additional pixel to the converted image data; and a scaling means for controlling the position determining means and the correcting means so as to scale the converted image data up or down by causing the position determining means and the correcting means to repeatedly perform the position determining process and the correction process with respect to each of sub-scanning lines of pixels and then repeatedly perform the position determining process and the correction process with respect to each of main-scanning lines of pixels, wherein the pixel of the plurality of pixels located at the respective position in the image data which is stored in the storage means and corresponds to the position of the additional pixel is a pixel of a reference image.

* * * * *